United States Patent [19]

Hill et al.

[11] 4,034,210

[45] July 5, 1977

[54] CREDIT CARD CARRIERS AND METHODS OF MANUFACTURE

[75] Inventors: James E. Hill, Prospect Heights; Baesley I. Dahlstrom, Des Plaines; Robert D. Fisher, Melrose Park, all of Ill.

[73] Assignee: Dynetics Engineering Corporation, Wheeling, Ill.

[22] Filed: Sept. 19, 1975

[21] Appl. No.: 615,112

[52] U.S. Cl. .................. 235/61.12 N; 53/266 A
[51] Int. Cl.² .................. G06K 19/00; B65B 5/10
[58] Field of Search ............ 235/61.12 R, 61.12 M, 235/61.12 N; 229/68 R, 70, 75; 283/57, 58, 59, 66 R

[56] References Cited

UNITED STATES PATENTS

| | | | |
|---|---|---|---|
| 2,132,412 | 10/1938 | Gollwitzer | 235/61.12 R |
| 2,396,221 | 3/1946 | Yancey | 283/58 |
| 3,242,637 | 3/1966 | Wills | 53/266 A |
| 3,363,917 | 1/1968 | Gunderson et al. | 283/58 |
| 3,431,404 | 3/1969 | Brink | 283/58 |
| 3,431,404 | 3/1969 | Brink | 235/61.12 R |
| 3,576,972 | 5/1971 | Wood | 235/61.12 R |
| 3,593,913 | 7/1971 | Bremer | 229/68 R |
| 3,702,924 | 11/1972 | Wood et al. | 283/58 |
| 3,800,124 | 3/1974 | Walsh | 283/58 |
| 3,912,160 | 10/1975 | Gendron | 229/70 |
| 3,936,993 | 2/1976 | Dorer | 53/266 A |

Primary Examiner—Daryl W. Cook
Attorney, Agent, or Firm—Jacques M. Dulin

[57] ABSTRACT

Single-sheet, multi-panel carriers for receiving and retaining credit cards during credit card issue and mailing procedures. Cards may be inserted in the carriers manually or by machine. Plural carrier forms are preferably provided in a continuous fan-folded web, and individual carriers are separable therefrom at perforations between subsequent and/or adjacent carriers. The carriers have special slits or slots for retaining one to four cards singly, or double that in a piggy-back manner, in vertical or horizontal configurations. Carriers also have a plurality of panels which assist in retaining the cards by wedge trapping during manual or machine issue processing (inserting, collating, verification and stuffing) and mailing operations. Carriers also carry verification and/or identification information thereon relating to the account, e.g., name, number of cards, account(s) number(s), credit limit, address, debit usage criteria, and the like, in one or more forms which may be read visually, electro-optically, mechanically, optically, electromechanically, magnetically and/or electronically. Carriers are specially adapted for production by sheet-fed glued, or roll-to-fold, high-speed web printing procedures. Imprinting of verification and/or identification indicia may be done by any impact or non-impact procedures, e.g., by drum, line, or computer-controlled, non-impact, spray-type printers.

65 Claims, 9 Drawing Figures

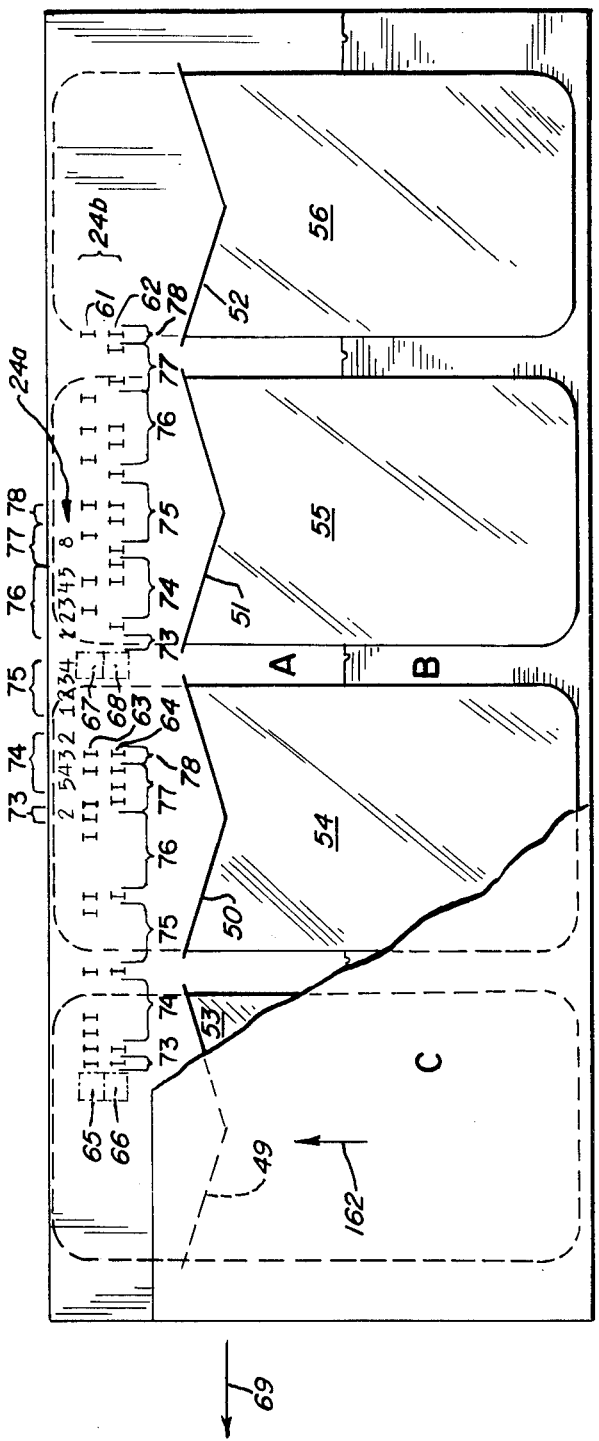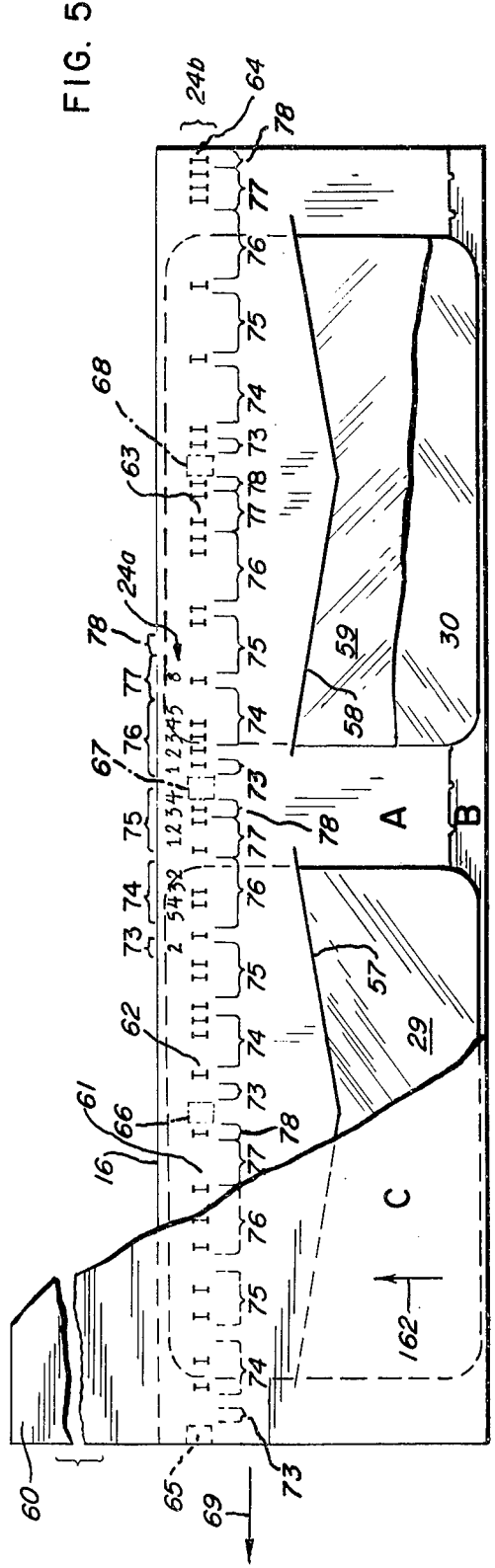

FIG. 7

| | | |
|---|---|---|
| L1 | LINCOLNLAND NATIONAL BANK OF ILL | |
| L2 | (312) 877-4567 | |
| L3 | MR. RALPH C. JOHNSTON | 73 |
| L4 | 7890 1234 123456   03   $1,000.00 | |
| L5 | 1234567890 | |
| L6 | 0711-0111  1234567890   $200 MONTHLY | |
| L7 | WAYNE T. WILLIAMSON | |
| L8 | APT 4B | 27 |
| L9 | 6789 MAPLETREE ROAD | |
| L10 | LINCOLNLAND, IL 67890 | |

| | WAYNE T.      1 | ALICE F.      2 | EDWARD L.     3 |
|---|---|---|---|
| L11 | | | |
| L12 | 7890 1234 123456 | 7890 1234 123456 | 7890 1234 123456 |
| L13 | 1234567890 | 1234567890 | 1234567890 |
| L14 | 07110111 1234567890 | 07110111 1234567890 | 07110111 1234567890 |
| L15 | 1,2,3 | 1,3 | 3 |
| L16 | 1,2,3 | 1,2,3 | 1,2,3 |
| L17 | 2,3 | 2,3 | — |
| L18 | 1,2,3 | 1,2,3 | — |
| L19 | $1,000.00 | $1,000.00 | — |
| L20 | $50  DAILY | $200 WEEKLY | $25 MONTHLY |
| L21 | (312) 877-4567 | (312) 877-4567 | (312) 877-4567 |

L22  67892312345  7890 1234 123456
L23
L24
L25
L26

CREDIT CARD CARRIERS AND METHODS OF MANUFACTURE

FIELD

This invention relates to special preprinted "credit"-type card carrier forms, apparatus for automated insertion, folding, pulling and stuffing, and methods of production and manual or automated use thereof. More particularly, this invention relates to single-sheet, multiple-flap credit card carriers having slits or slots in one or more panels for receiving and retaining by wedge trapping credit cards during manual or automated procedures of issue and mailing of the cards to card users. Special information is provided on the carrier to insure that the appropriate number of correctly matched cards are inserted in their appropriate carrier, and for manual or automated "pulls" after insertion.

BACKGROUND

In the United States there were about 500 million credit cards in circulation in 1974, and an additional 200 million were issued that year on new accounts or to cover maintenance (renewal). These numbers do not include the emerging debit card field (for bank or S and L account access), nor the ID and security card fields.

Such cards (called herein "credit cards" for simplicity) being equivalent to or providing access to money, property or credit, must be handled with accuracy under stringent security during issue of the cards, i.e., manufacturing, preparing for distribution, and actual distribution (e.g., by mailing) to the cardholder-customer. The correct number of cards must be correctly embossed and/or encoded with the cardholder's account number and other data. The embossed cards must be protected from theft until they are in the hands of the cardholders.

The preparation for distribution of the cards must likewise be done accurately under stringent security precautions. The cards are normally placed in what is called a carrier and mailed (first-class registered or certified mail) to the cardholders. Advance notice and/or follow-up verification mailings may also be used to help insure against theft or notify promptly of non-receipt by the addressee-card user.

It is an extremely serious matter when the wrong cardholder receives the wrong card or wrong number of cards. If a cardholder is supposed to get two or three cards and receives only one, or if a cardholder receives a card of another account, there is a chance for theft of goods by credit cards. The average loss is in the four-figure range with highest losses in five figures. The matter is even more serious in the case of debit cards. Such cards give access to a person's checking and/or savings account. Cards going to the wrong person creates a theft potential. This highlights the need for carrier forms and manual or machine methods of accurate inserting and preparation for distribution.

Currently, carriers for cards are typically heavy paper stock having two or four straight, diagonally oriented, separated slits to hold two or four corners of the cards. Most cardholding carriers are single sheets of card stock slightly smaller than number 9 or 10 envelope size so that they can be inserted in a mailing envelope. Pocket-type carriers are made of two sheets of paper glued or secured together to provide a pocket therebetween. A slit in the upper sheet for access to the pocket may be provided, or access may be at the sheet edges. Other currently used carriers may be single sheets having a single fold to provide two flaps of slightly smaller than envelope size; these are commonly used in carriers having two diagonal slits in one of the flaps. A few current carriers have a second fold to provide a third flap, and some of these have no slits for retaining the cards. Some carriers (no longer in extensive use) employed pressure-sensitive glue or tape to secure the cards thereto.

Typically, currently available carriers have space for two cards oriented horizontally, that is, with the long axis of the card oriented parallel to the printing and/or long axis of the carrier (as folded for mailing). Simple, single-flap carriers are relatively inexpensive, running around $10–30/thousand, while the multi-layer, pocket-type carriers are very expensive, running $35–80/thousand.

Most cards are inserted manually in the two-slit, no-slit or pocket carriers. There are two basic approaches. In one, the person inserting the card has a stack of precut, single-sheet carriers having no account information thereon, and a stack of presequenced cards. They also have a stack of separate sheets of thin paper which are presequenced mailers with address and account information. The inserter compares the account number on the card to that on the separate mailer. The cards are inserted by hand into the slits or pockets of the carrier, assembled with the mailer, and then placed in envelopes. The second approach involves having account information typed onto the individual carriers which are presequenced and assembled with presequenced cards. A top-rated inserter is capable of inserting 1,500 accounts in an 8-hour day with an average of 1.7 cards per account. The average acceptable rate is generally, 1,000 accounts per day, and low is 750/day.

Correct presequencing of the cards and carriers or inserts is critical to any reasonable rate of manual insertion and to reducing the frequency of mismatch errors. Further, such manual insertion rates require many workers in order to keep up with the rate of production of credit or debit cards. For example, automated embossing machines have a current card embossing rate ranging from 350 to 1,500 cards/hour. The rates are the same for encoding cards bearing magnetic stripes.

We believe there is a machine available that can insert a card in a four-slit carrier by flexing the card along both its major and minor axis so the four corners can be popped into four respective corner slits. Another machine is capable of putting a dab of glue on the carrier and depositing the card thereon. However, neither machine matches the cards and carriers, so mismatch errors will occur unless exact sequencing is maintained. In automated equipment of this non-verifying type, once a sequence error occurs, all subsequent insertions will continue to be mismatched.

Current hand and machine inserting depends on the accurate presequencing of the cards and mailers or carriers. Further, where cardholders are to receive three cards, a second carrier must be used or the cards must be piggy-backed. Carriers have positions for either one or two cards held in horizontal orientation. For issues having more than two cards, the cards are stacked or placed piggy-back in one or both positions. Generally, no more than two cards are piggy-backed in any one position allowing a maximum of four cards in a two-position carrier.

The current carriers render methods of inserting relatively slow and prone to errors. They are not particularly adaptable to both hand and machine inserting, folding and stuffing, and normally require separate address inserts. There is thus a need for improved credit card carriers that are simple, rapid and inexpensive to manufacture, to preprint with account and verification information, and which are useful for manual or machine inserting. The instant carrier satisfies those needs and is particularly adapted to automated mechanical verification and insertion of credit cards in the apparatus and method shown and described herein.

THE INVENTION

OBJECTS

It is among the objects of this invention to provide simple, inexpensive carriers for embossed, printed, punched or encoded cards, e.g., bank, credit, debit, identification, security cards and the like, which carriers are adapted for either manual or automated insertion of such cards.

It is another object of this invention to provide carrirs which are adapted to carry verification and/or identification information thereon which can be visually, mechanically, optically, electromechanically, magentically or electronically read therefrom.

It is another object of this invention to provide automated apparatus and method for verification of cards and carriers, insertion of cards in carriers, folding inserted carriers, pulling bad accounts, and stuffing of completed carriers in mailing envelopes.

It is another object to provide a method of manufacture and use of specially designed card carriers, particularly in the automated verification and insertion apparatus of this invention, which carriers carry information used in verification and insertion of credit cards in the carriers, and for pulling of bad accounts just prior to mailing.

It is another object to provide special carriers that can hold one to four cards singly (or twice that in double or piggy-back modes) in vertical or horizontal configurations by means of a single slit, and which carriers have multiple panels of proper dimension to frictionally wedge-grip the card edges thereby securely retaining the cards in the carriers.

It is another object to provide a special continuous web, or plurality of webs of carriers, which may have one or more set of apertures adapted for cooperating with pin-drive type advancing or indexing mechanisms, which apertures may be in the carrier body or in removable marginal strips.

It is another object to provide special card carriers having folds designed to securely wedge-trap the card along two opposed edges to prevent cocking of the cards or tearing of the slits in use.

It is another object to provide special card carriers on which account and/or card verification and/or identification information may be printed by conventional line or drum printers in a single or double-up roll or fan-fold configuration.

It is another object to provide special carriers having account address information thereon which may be manually or mechanically stuffed in envelopes without need for separate mailing inserts.

It is another object to provide apparatus for verification of the number of cards in a carrier after being sealed in an envelope and rejecting those having an incorrect number of cards, and for pulling bad accounts after sealing and before mailing.

It is another object to provide special card carriers which have as a separable part thereof wallet-sized ID, account information or loss notice cards.

It is another object to provide special single-sheet card carriers that are easy and inexpensive to manufacture in a sheet-fed glued or continuous roll-to-fold manner by printing, perforating, slitting or boning and punching operations on web stock by conventional apparatus.

Still further and other objects of the invention will be evident from the description which follows.

FIGURES

The description which follows will have reference to the drawings in which:

FIG. 4 is a plan view of a portion of another carrier embodiment showing an alternate positioning of the machine-readable carrier code, and A panel slits for receiving four retail-type cards in a vertical orientation;

FIG. 5 is a plan view of a portion of another carrier embodiment showing a single line code arrangement, and slits in the A panel for receiving single or piggy-back cards in a horizontal (transverse) orientation;

FIG. 7 is a plan view of another carrier embodiment having tear-out wallet cards for individual cardholders of the same group;

SUMMARY

Figure 1:
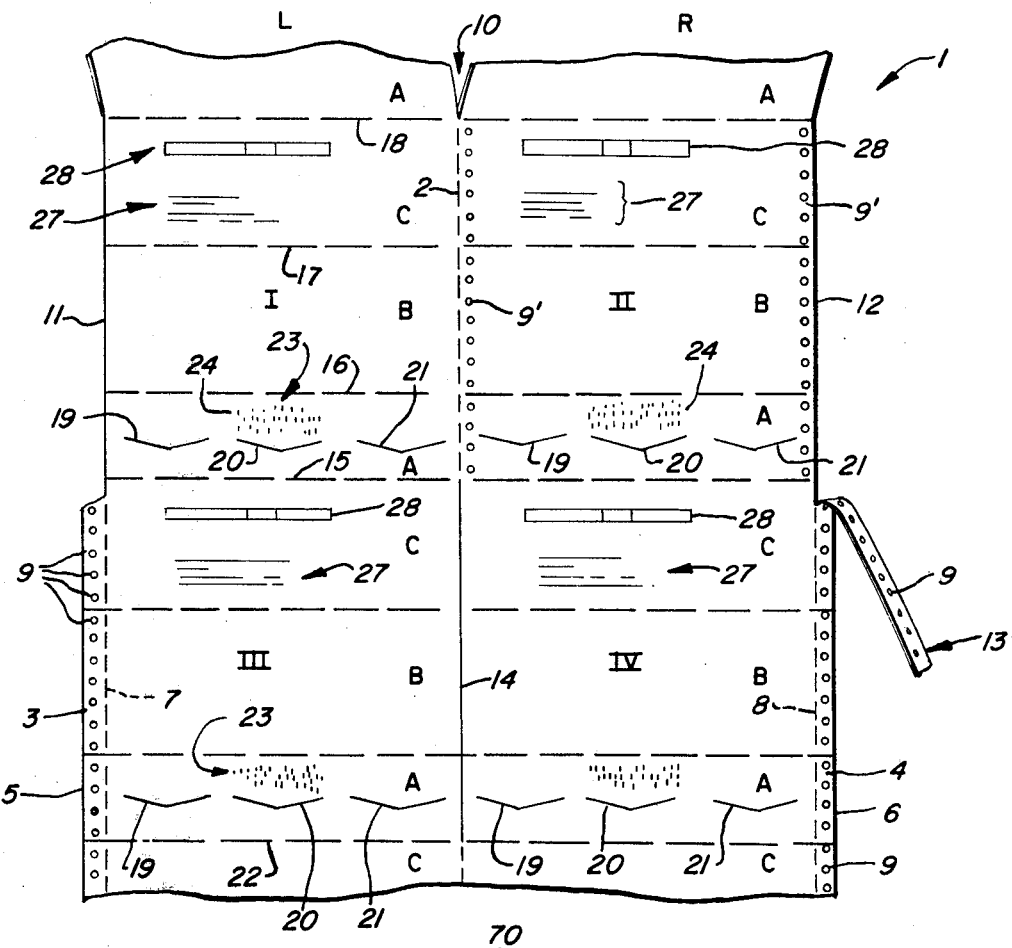
FIG. 1 is a plan view of the front side of a two-wide carrier web as printed by a line printer, also showing separation into an L and a R stream for fan-folding and removal of the sprocket drive marginal portions.

The invention includes continuous and single-sheet, plural-cardholding, multi-panel (or flap) credit card carriers, their method of manufacture and use, and apparatus and method for verification and insertion of cards in the carrier. The carriers are used for retaining the cards during certain credit card issue procedures, including mailing to the cardholders. A first marginal panel, the A panel, contains from one to four specially designed slits for receiving the cards by manual or automated insertion, in vertical (preferred) or horizontal orientation. The cards may be inserted sequentially or simultaneously, singly or piggy-backed (two or more in a single slit). The A panel cooperates upon folding along internal perf lines with a central B panel and a second marginal panel, the C panel, to retain the cards by wedge trapping without loss or misalignment (cocking) during handling and mailing.

The A panel contains special positions thereon for receiving and carrying information relating to the account which may be read visually by manual inserters or by checker-operators, or may be read automatically by mechanical, optical, electromechanical, electro-optical, magnetic and/or electronic scanner means to provide information during automated insertion or thereafter, e.g., stuffing or pulling operations. Typically, the information is in the form of alphabetic, numeric or optical characters (e.g., I-bar code) or mag stripes and contains information about the account, the card issue, number of cards to be placed in the particular carrier, and the like. Account indicia, for example, may be numeric and positioned adjacent to an internal perforation (carrier form fold line) so that account numbers may be presented for visual scanning when the carriers are completely inserted, folded and stacked ready for insertion into mailing envelopes.

The C panel contains special positions thereon for receiving and carrying other account information that may be in any of the modes described above for the A panel. Typically, the information is in the form of alphabetic and numeric indicia, for example, name and address of cardholder, account number, number of cards, credit limit and the like. The address indicia is specially positioned for juxtaposition with a window in standard or special window-type mailing envelopes.

The carriers may be printed with informational, instructional, contractual or advertising information on one or both sides. The completed carrier, in the folded form with cards inserted, is slightly smaller than standard "long" mailing envelopes, i.e. 3½ inches wide × 8.4 inches long (8.89 cm × 21.34 cm) and is adapted for manual or automated stuffing into such mailing envelopes. In one embodiment, the B panel is perforated to provide from one to four wallet-sized or postal-sized cards. Special information for the cardholder may be printed in special areas of the cards, for example, all the information required for loss notification.

The carriers are produced by a multi-step process, broadly broken down in two stages: Stage 1 is production of blank carriers or carrier webs in continuous form or single sheets. Stage 2 involves printing of the individual issue and account information by data processing equipment to ready the carriers for card insertion, folding, pulling and stuffing into mailing envelopes.

Typically in Stage 1, suitable sheet material, such as paper of weight ranging from 15–45 lbs and gauge of .002 to 010 inches, is provided in predetermined widths to produce one- or two-wide carrier forms. Producing continuous forms from a web roll of paper stock is preferred, but single sheet printing may be employed. The sheet material or web is printed in any suitable manner, preferably by conventional lithographing techniques, with preselected indicia of an instructional, informational, contractual and/or advertising nature on one side (preferred) or both sides in single or multiple colors. Selected areas of a first, face side of the form remain unprinted to receive thereon special information provided at a later step. The web advances to perforating stations where the web is perforated parallel to the web travel with perforation wheels, and across (transverse) to the sheet or web travel by cylinder or drum perforating knives. Special slots are also cut through the web or sheets to receive credit cards.

The perforations provided are of two types: The first is called the "internal perf" (internal with respect to the carrier). Two internal perfs are provided in each form to define therein the three carrier panels. The carrier panels may be folded along these perfs. The second is called the burst or fold perf. This perforation permits fan folding of the web of forms and separation of individual carriers from the web or sheets, or sets of two-wide carrier forms into two separate single ones or trains of carriers.

The web or sheets optionally may also be perforated along a line or lines spaced from one or more margins to provide a strip which is punched with holes adapted to receive web or carrier advancing means, such as a tractor, sprocket or pin drive mechanism. These perfs are of a type which permits the strip to be removable prior to stuffing the carrier into mailing envelopes. These drive strip-defining perfs may be omitted with the drive holes remaining in the finished carrier. Drive holes may be omitted where the carrier is to be manually inserted and stuffed with a mailer piece. The pin drive holes may be punched into the marginal edges of the carrier forms without marginal perf lines defining a removable drive strip.

The carriers may be fan folded along the second perf lines (called burst/fold lines) and boxed for shipment to data processing centers of the card issuer or service organization. Alternately the carrier web or sheets may be fed directly to the Stage 2 imprinting operations.

Alternate manners of handling the web or sheets are contemplated, such as bursting and stacking individual carrier forms for use, particularly manual insertion, or forming a roll of the completed carrier web. Individual sheets may be glued end to end to provide a roll or fan fold of carriers. Where the web or sheets are produced two-wide, a center perf parallel to the outer margins defining therebetween the two carriers may be boned, slit or burst to form two sets, streams or trains of one-wide carrier forms, and these streams interleaved (fan-folded together), stacked, or rolled up together.

Stage 2 imprinting involves applying individual account information to the front and/or back face of the individual carrier forms, typically by data processing equipment such as impact (line or drum) or non-impact printers. Such printers may be computer controlled and apply preselected information about the accounts to individual carrier forms in the proper sequence. These printers may also apply machine-readable code, such as I-bar code, variable space or variable width bar code, and the like to preselected portions of the carriers. These codes are positioned on the carriers to cooperate with read heads in automatic card inserting machines and to supply instructional (command) or verification information to such machines.

In one embodiment, a special I-bar binary code presents information which identifies the number of cards to be inserted in the carrier, the card issue (run number), the issuer number, cardholder account number, spaces, and an end signature instruction. This carrier information is compared by the machine with information on the cards, and command logic initiates mechanical insertion of the appropriate number of correctly matched cards in their appropriate carrier.

Prior, intermediate or subsequent steps, as required, of separating individual carriers from the web or sheets, stripping, cutting or boning pin drive margins from the carriers, and folding carrier panels are done manually or by automation. The code information also permits last minute automated pulling of bad accounts after insertion and just before stuffing by permitting in-line or stack scanning of completed inserted/folded carriers to produce an up-dated issue. The up-dated issue of completed/folded carriers is then stuffed into window-type mailing envelopes with the address indicia oriented for visual reading.

The instant verification and insertion system (VIS) apparatus and method involves: sensing information in or on cards (embossed, magnetic strips, printed, punched, inlaid, permanent magnetic code embedded cards, and the like); feeding continuous carriers or single-sheet carriers into the VIS apparatus; in the case of continuous carriers, separating individual carriers from the web; sensing information carried on the instant carriers; comparing the information on the cards and carriers; automatically inserting the appropriate number of correctly matched cards in the appropriate carrier; and folding the carrier in a form ready for automated stuffing into mailing envelopes; pulling bad accounts after folding; and stuffing in mailing envelopes. Reject, pause and search modes of operation are provided.

Any mode of printing or applying the preselected information in Stages 1 and/or 2 may be employed. For example, non-impact printers, with or without computer control, of spray or other type operation may be advantageously employed in Stage 2. The information may be in any "language", such as standard letters or characters, or optically readable special font, such as 7B font, or OCR 1428 (IBM), or may be electronically encoded in a magnetic stripe of material (e.g., iron oxide, chromium oxide or the like) applied to the carrier or carrier web in a preselected position. The information may be in the form of punched apertures (Hollerith) in one or more carrier flaps, or embossings in the carrier sheet material.

It should be understood that throughout, credit card is a shorthand reference to any type of card susceptible of being or requiring transporting or handling by a carrier, and includes by way of example credit cards, bank cards, debit cards, retail cards, identification cards, account cards, security cards, pass cards, key cards, photo ID cards, charge cards and the like.

DETAILED DESCRIPTION

The following detailed description is by way of illustration and not by way of limitation of the priniciples of the instant invention. In many of the drawings herein single figures are used to illustrate multiple embodiments for conciseness and not as limiting the invention. While continuous forms, strips or webs are discussed in most detail herein, it should be understood that the principles of the invention apply to single sheet forms and their manner of use.

In FIG. 1 a two-wide (or two-up) carrier form set 1 is shown, face or front side up. This form set comprises an L stream and an R stream (for Left and Right streams, respectively), so designated at the top of the form set. These two streams are defined on either side of a central (longitudinal) line of perforations 2. The forms or streams preferably have removable marginal strips 3 and 4, but they are not required as illustrated by carriers I and II (FIG. 1). carriers III and IV (FIG. 1) are shown as having marginal strips (also called drive strips) which are defined between side edges 5 and 6, respectively, and lines of perforations 7 and 8 spaced inwardly therefrom (with respect to the edges). These marginal strips may contain any convenient type of apertures 9 which are adapted to be engaged by driving or guiding mechanisms during production or use of the carrier forms, e.g., by pin drives, tractor drives, pin chains, pin belts, indexing mechanisms, pin guides and the like. As shown in carrier forms II of FIG. 1 and III of FIG. 3, the drive, indexing or guide apertures 9' are spaced inwardly of the carrier margins 2, 12, 7 and 8, respectively. The drive strips 3, 4 are left on, or optionally may be separated from the form edges 11 and 12 as shown at 13. The form sets are separated as at 10 along the central perf line 2, e.g., by slitting or boning with one or more rotary or fixed knife cutters, into continuous single (or one-up) carrier form streams L and R.

Four complete, individual carriers (carrier forms) are shown in FIG. 1, being numbered I, II, III and IV, as shown. This numbering reflects the sequence of separation (bursting) of individual forms from the two-wide sets stream 1 during decollating, folding and insertion in the automated verification and insertion system device (VIS). The form sets of FIG. 1 are fed face down as interleaved streams L and R into the VIS; hence the left carrier is separated first.

FIG. 1 also illustrates several alternate embodiments, the first of which comprises a form set of two individual carriers I and II separated by perf line 2 but having narrower marginal edges 11 and 12 and no marginal drive strip. In a typical two-wide stream, the carriers would be alike, but are shown different for purposes of illustrative conciseness. Carrier I has no drive or indexing holes, while carrier II shows drive holes 9' adjacent the margins. The carrier I embodiment is particularly useful for manual insertion of carrier forms, and for automated folding and/or insertion processes not requiring sprocket or pin drives, indexing mechanisms, or guides and the like. For example, automated devices can employ pinch rollers or belts for movement of the carriers which do not require the marginal strip. The carrier II embodiment is useful where there is no objection to cardholders receiving carriers with holes. While the carrier II embodiment is shown narrower than carrier III or IV, it should be understood that by omitting perf lines 7 and 8, a wider form of carrier II is produced. The perf lines 7 and 8 are not absolutely required, as slitters or cutters can strip off a marginal strip from carriers III and IV without aid of those perf lines 7 and 8.

Still another alternate embodiment is illustrated by the carrier forms III and IV of FIG. 1 (with or without the marginal drive strip 3 and 4). This is a double carrier, in which the perf line 2 is replaced by a fold line 14. The fold line is preferably an embossed groove to assist in folding, but may alos be a line of perforations spaced widely enough apart to assist in folding but not so numerous to permit ease of separation of carrier III from IV. The double carrier provides twice the number of card pockets, and after insertion may be folded along line 14 to fit into a standard envelope.

Individual carrier forms comprise three panels extending between form margins 11 and 12, respectively (or drive strip perforation lines 7 and 8, respectively) and the central perf line 2 or fold line 14, as the case may be. These panels are designated as the A, B, and C panels, respectively, and each performs a separate and distinct function as well as being adapted to be cooperatingly interrelated in combination to provide the improved properties of the form. Viewing form I of FIG. 1, the A panel is shown in this embodiment as defined between transverse stream burst/fold line 15 and transverse form fold line 16. In this embodiment, panel A has the smallest width (in the longitudinal direction) between perf line 15 and fold line 16, and includes three specially designed and placed V-shaped slits 19, 20 and 21, each for receiving one end of individual credit cards.

A note about terminology: Line 15 is a line of perforations adapted by appropriate cut and tie spacing to permit tearing or bursting of the form, here form I, from the carrier stream, here stream L. The carrier stream is also foldable along line 15, e.g., when the carrier streams are fan folded singly or interleaved with stream R. Thus, with respect to the stream, line 15 is a stream fold line while at the same time, with respect to the carrier, is a burst line. These are called burst/fold lines. The same is true of perforated lines 18 and 22. In contrast, lines 16 and 17 are embossed, scored, or lightly perforated lines (internal perfs) along which panals of the individual forms are folded. These lines are thus fold lines with respect to the forms, and called form fold lines or internal perfs to distinguish them from the stream burst/fold lines. The direction along the stream, from the bottom of FIG. 1 to the top (or vice versa) is called the longitudinal direction, or axial direction, or the direction of stream travel during production. The direction of the stream burst/fold and form fold lines (internal perfs) in FIG. 1, at 90° to the longitudinal direction, is the transverse direction. Note, however, that in FIG. 3, the directions are reversed, that of the form fold lines being longitudinal and the stream burst/fold lines being transverse.

As described in more detail below, the A panel also has provided thereon visually readable or machine readable information means 23, such as indicia 24, magnetic stripe 25 (FIG. 3), punched holes 26 (FIG. 39 and the like. The spacing and placement of these information means are inportant as discussed below.

The B panel is defined between form fold lines (internal perfs) 16 and 17. This panel is slightly wider than the length or width of the credit card being received by the carrier depending on whether the card is held vertically or horizontally. For example, for a standard credit card of dimensions 3.375 × 2.125 inches (8.573 × 5.398 cm)held vertically (see FIG. 2 orientation of the card with respect to the carrier), the B panel width (distance between fold lines 16 and 17) is 3.5 inches (8.89 cm). For a standard card retained horizontally (FIG. 5), the B panel width is 2.250 inches (5.715 cm), while for a retail card retained vertically (FIG. 2), the width is 3.625 inches (9.21 cm). For the retail card retained horizontally, the B panel width is 1.844 inches (4.683 cm). Generally, the B panel is 0.125 inch wider than the relevant dimension of the card sought to be trapped. This provides an excellent frictional wedge-trapping of the card in the fold, yet it is not so tight that folding is difficult.

In another embodiment the panel also has tear-out wallet cards 79, 80, 81 such as shown in FIG. 7 and described in more detail below. The B panel can be imprinted with information-conveying indicia, such as the cardholder contract, lost and found information, advertising information, use instructions and the like. The panel width is adapted to securely wedge trap and grip the ends of the credit cards in carrier folds defined along form fold lines (internal perfs) 16 and 17 without binding the form stock. Likewise, the B panel is not so much larger (wider) than the cards that they become canted or loose in the folded carrier and tear the slits permitting them to become lost or misplaced during carrier insertion or use.

Panel C (FIG. 1) is defined between form fold (internal perf) 17 and the upper marginal edge of the form which is defined by stream burst/fold line 18. This panel width is carefully designed to form a flap over the exposed portion of the credit card projecting from the retaining slits (see FIG. 2), while selectively revealing all or a portion of the information means 23, such as aliphatic and/or numeric indicia 24a and/or bar code 24b (shown by way of example as I-bar code in FIGS. 2, 4, 5, 6 and 7). The folded-over panel thus assists in retaining the card in the carrier during use while permitting visual or automated checking of at least a portion of the information 23 when the carriers are inserted, folded and stacked ready for envelope stuffing, or for pre-stuffing pulling. Typically, the width of the C panel for a standard credit card is 3 inches (7.62 cm) between form fold line 17 and stream burst/fold line 18. The C panel also typically carries address indicia 27 and account information indicia 28. Optionally, the indicia is positioned on the panel so as to be visible through the window of a standard No. 9 or No. 10 envelope when the inserted/folded carrier is stuffed into such an envelope.

Figure 2:
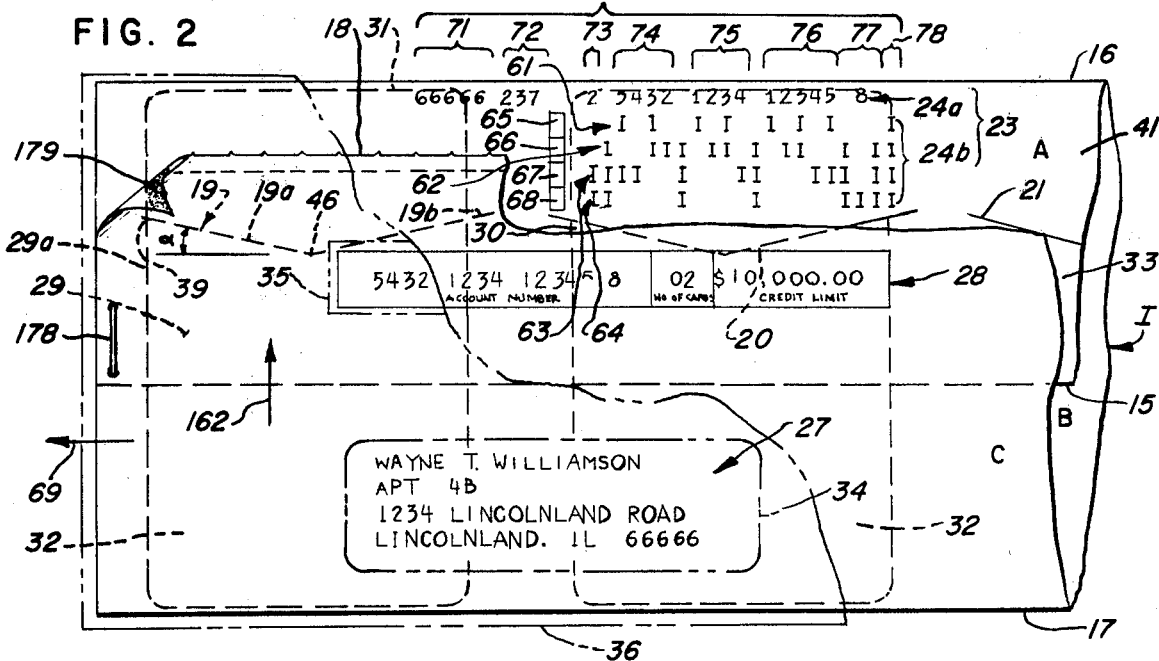
FIG. 2 is a plan view, partly in section of one embodiment of a special carrier of this invention having cards inserted therein, and showing the location and arrangement of one embodiment of a machine-scannable code on the carrier which provides information on the account and number of cards.

FIG. 2 shows a single carrier I in the folded condition and having two stardard credit cards 29, 30 inserted into pockets 19 and 20. In the embodiment shown, each limb of the slit 19a, 19b is inclined at an angle $\alpha$ defined between the slit limb and a line parallel to the carrier end 15 and touching the V-slit tongue 46, of between 5° and 45°, preferably 10°-20°. The angle $\alpha$ as shown in FIG. 2 is 12°. The spacing between the end of the slit 39 and the card margin 29a may range from 0.02 to 0.1 inch (0.51 to 0.254 cm) and is typically 0.062 inch (.157 cm) as shown in FIG. 2.

A first end 31 of the card 30 is slipped into the V-shaped slit 20 and is trapped in the fold 16 of the A and B panels. The second end 32 of the credit card overlies the marginal portion 33 of the A panel lying between the slits 19, 20, 21 and the edge 15 and is trapped in the fold 17 of the C and B panels. The upper marginal edge 18 of the C panel leaves the indicia 24a or 24b visible for verification of the carrier after it is in the folded condition. Thus, it is possible to scan an entire stack of inserted/folded carriers to locate or verify any particular ones therein. This is particularly useful in pulling or checking operations. Card accounts often must be terminated for a variety of reasons (poor credit, theft, moving, etc.) just prior to issue. For current conventional insertion it is not feasible to automatically locate the bad accounts and pull them prior to mailing. In the instant invention, it is possible using the indicia or code (see 24b in FIG. 5) to scan (visual or automated) the completed carriers just prior to stuffing and pull the bad accounts, or pulling after stuffing.

The address indicia is positioned to lie adjacent to and be visible through the window of standard No. 9 or No. 10 mailing envelope, shown in phantom in FIG. 2 as item 54. Portions of the account information 28 may also be positioned adjacent to the window 34, if desired, or alternately, one or more special windows 35 may be provided in the mailing envelope 36, shown in phantom lines in FIG. 2.

Figure 3:
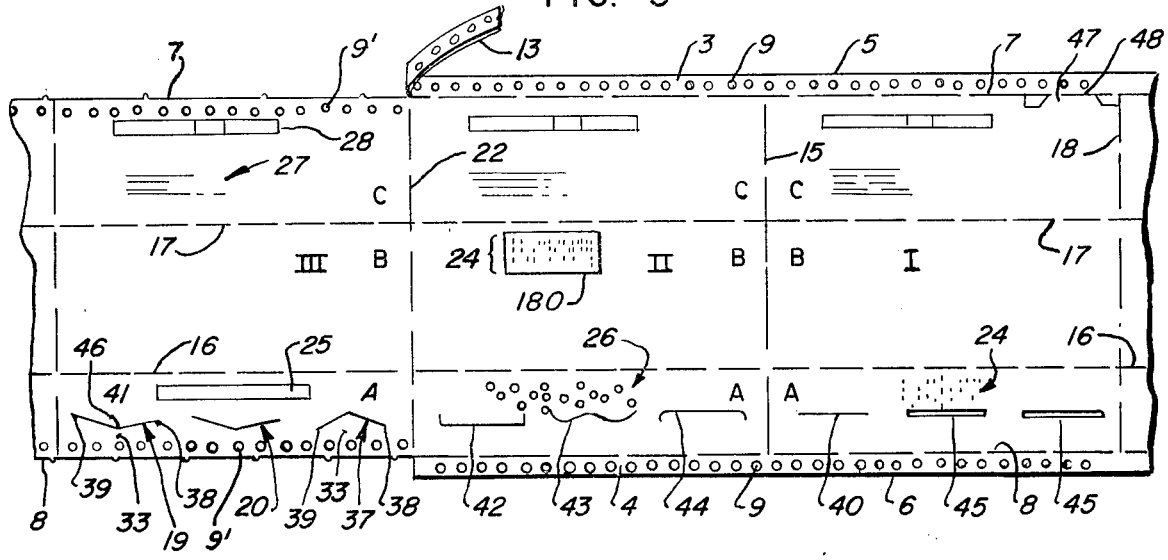
FIG. 3 is a plan view of a 1-up web of carriers adapted for printing by a drum printer, and having various optional types of card slits or slots in the A panel and an optional tab on the C panel.

FIG. 3 illustrates a one-up stream of carrier forms oriented at 90° to that of FIG. 1, i.e., with the form fold lines (internal perfs) 16, 17 in the longitudinal direction (from left to right in FIG. 3). The stream fold/burst lines 15, 18, 22 are oriented transversely. This embodiment is particularly suited to drum or roll printing as distinct from line printing which is particularly suited to one- or two-wide form streams oriented as in FIG. 1. Any type of printing the common and individual information on the forms may be used, whether impact or non-impact types of printing. The marginal strips 3, 4 may be omitted, or only one strip employed, as required, with or without drive holes 9,9'.

FIG. 3 also shows a number of card-retaining slit and slot variations. V-shaped slits oriented as in FIG. 1 with the V tip adjacent the carrier margin 8 are preferred. However, a reverse oriented V-shaped slit 37, carried herein an A slit, may be employed. The V slit is superior, and while we do not wish to be bound by theory, we believe that the presence of a leading tongue or lip 46 assists in guiding the card into the slit if the cards are slightly misaligned during insertion. To assist in preventing tearing, the slit area may be reinforced, or the slit ends 38, 39 may terminate in a T or a small aperture.

To effect insertion, the marginal area 33 of the "A" panel between the slit 19 and edge 8 may be depressed relative to the medial area 41 of the A panel lying between the slit 19 and fold line 16, and the card is then inserted. The same is true for the A-slit. Slits 42, 43 and 44 in carrier II of FIG. 3 are respectively identified as a U-shaped, a W-shaped and an inverted U-shaped slit. Oval or rectangular slots 45, and straight slit 40 are shown in carrier I. FIG. 3 also shows a marginal lip 47 in panel C having marginal or leading edge 48 which is shorter than the slot opening. The lip is thus adapted to be inserted into the slot, effecting a positive interlocking of the card into the folded carrier. This flap or lip 47 may be of any shape adapted to provide the interlock, and may be used with any of the card slits or slots.

FIGS. 4 and 5 are plan views of folded carriers, partly in section showing alternate slit and card arrangements. FIG. 4 shows a carrier having four-slits 49, 50, 51, 52 specially adapted for retail cards 53, 54, 55, 56 held in the vertical orientation, i.e., the long dimension of the card across the width of the B panel. The retail cards have dimensions of 3.50 × 1.844 inches (6.35 × 4.683 cm) and thus, for fit the carrier of this invention as shown. Since the B panel of FIG. 4 is longer than the B panel in a carrier for a standard credit card (FIG. 2) the A and/or C panels may be made smaller in width (between respective carrier fold and stream burst lines), or the overall width of the carrier (in the longitudinal direction in FIG. 1, the transverse in FIG. 3) may be increased. Special mailing envelopes to accommodate the increased width may be provided.

FIG. 5 illustrates a two-slit carrier for standard credit cards. The slits 57, 58 are dimensioned for the long axis of the standard card 29, 30. Also slit 58 is shown as accepting a second card 59 carried piggy-back on card 30 to provide for a 3-card account. Card 29 could also be piggy-backed providing for a four-card account. There is enough space between slits to provide for lengthening them. With longer slits, retail cards may be carried singly or piggy-backed in the horizontal orientation. The B panel is shorter than in carriers of FIGS. 1 and 4 to accommodate the horizontal orientation. Narrower envelopes may be provided, or the C panel enlarged to just short of the width of a standard No. 9 envelope to project upwardly (in FIG. 5) beyond the upper edge 26 of the A panel, as shown in phantom in FIG. 5 as item 60. This insures the inserted/foled carrier is properly oriented in the envelope, so the address indicia is presented opposite the envelope windows; no special envelopes are required. In this alternate embodiment some of the information means 23 may be placed on or repeated on the projecting edge 60 of the C panel. For example, the code information 24b may be placed on the marginal edge of the C panel extension 60 for the location and identification purposes described above.

FIGS. 2, 3, 4 and 5 also illustrate another special feature of the invention. The information means 23 may include machine readable information 24b for use in automated printing, inserting, folding and/or envelope stuffing machines. The information may be presented or carried on the carriers as visually readable indicia, or for reading by optical character recognition type devices, or as magnetic stripes or bars which are electromagnetically and electronically encoded and read (see mag stripe 25 in FIG. 3). The information may also be presented as Hollerith type punches (see punches 26 in FIG. 3), as bar codes readable by optical scanners (item 24b in FIGS. 2, 4, 5, 7 and 8), as embossings readable optically or by mechanical devices having sensing fingers, as OCR readable font (such as IBM 1428 in ASA sizes A, B or C), as OCR readable delta distance code (like the universal product code found on grocery items), as codes or indicia printed in fluorescent ink or struck from fluorescent ribbon and OCR readable under ultra-violet illumination, as mark sense codes, as bars printed in magnetic ink or struck from magnetic ribbon and readable by electromagnetic readers, as visually or OCR readable color bars, as magnetic ink or struck ribbon font readable by electromagnetic readers (like MICR readable font on checks), and the like. By way of example, the bar code form is shown herein, but it should be understood that the principles of the invention apply equally to the other forms mentioned or contemplated.

The information means 23, and more particularly machine readable information 24b, may be placed on any panel on a label disposed on a panel (see label 180 in FIG. 3), or on an envelope or label on an envelope. The information should be disposed in a position to be scanned visually or by the mechanical reading means of inserting, vertifying, pulling and/or stuffing devices. The information 24b is particularly suited to be disposed on a carrier panel juxtaposed opposite a special window in the envelope, e.g, window 35 (FIG. 2), so that it is readable therethrough. This permits verification (sealed enveloped detection) and pulling of accounts even after stuffing in envelopes. In another embodiment, information 24b is printed in transparent fluorescent ink over the address indicia 27 and is readable under ultra-violet illuminated through a standard envelope window, yet the code does not obscure the address and is not detectable by ordinary means.

The bar code specifically illustrated is I-bar code in FIGS. 1–3, 4, 5 and 8, and I-bar code in FIG. 7, as these are printable by standard printing devices, such as line printers, drum or roll printers, non-impact printers and the like. I-bar is preferred over 1-bar code as the top and bottom crossbars assist in producing reject error messages (cross talk) if vertical line weave occurs. The code 24b is different for each carrier, and contains information which serves a plurality of functions including identification of the particular carrier as that of a particular account (person), instructions as to the number of cards to be inserted, the card number to be inserted for verification (matching) of cards being supplied, the issuer number, issue number, run number, series number, carrier sequence number, and the like.

In FIG. 2 the I-bar code is shown as disposed in four horizontal rows, in FIG. 4 as two sets of two rows, and in FIG. 5 as a single row. This code is a binary code of 4 bits 1, 2, 4 and 8, the bars in each row representing 1 bit value. Referring to FIG. 2, the uppermost row 61, each I represents a one, the next row below that 62 contains the twos bars, the third row 63 contains the fours bars, and the bottom row 64 contains the eights bars. In FIG. 4 the rows are paired with a first pair to the left of a second pairs, for example, the ones and twos rows 61, 62 to the right of the fours and eights rows 63, 64. In the alternative, the ones and fours rows may be spaced to the left with two and eights to the right. In short, any convenient pattern of rows may be employed so long as the scanning device for reading the bar code is oriented appropriately:

| 1 4, | or | 1 2, | or | 1 8, | or | 8 2, | etc. |
|---|---|---|---|---|---|---|---|
| 2 8 | | 4 8 | | 4 2 | | 1 4 | |

In FIG. 5 the rows are spaced along a single line with the rows order illustrated being 1, 2, 4, 8; of course, any convenient sequence may be employed: 1, 8, 2, 4; 4, 1, 8, 2, etc.

Another form of single line code that may be used is double frequency coherent phase encoding (an encoding technique developed by Aiken in 1954). The data is comprised of data and clocking bits together. An intermediate bit occurring between clocking bits signifies a one, the absence of an intermediate bit between clocking bit signifies a "zero". Of course, other techniques of encoding, single or multiple line, may be employed.

The areas 65, 66, 67, 68 represent initial starting portions that scanner heads look at when the carrier is properly indexed into the automated card insertion/carrier folding apparatus. When the carrier and scanner heads are moved relative to each other, e.g., in the direction shown by arrow 69 in FIGS. 2, 4 and 5, the four binary bit rows are scanned simultaneously. In the alternative, the rows may be scanned sequentially, if desired, by applications of the scanner head or controlling the carrier motion. For example, a single scanner can scan the four rows on the carrier of FIG. 5 in sequence as it moves from left to right (in FIG. 5) across the rows.

Vertical spacing of the rows is not particularly critical. Standard vertical spacing of line printers is either ⅛ inches or 1/6 inches. "I" symbols are preferred rather than plan vertical bars to detect vertical crosstalk. Only the center portion of the "I" bar is optically scanned; therefore, vertical spacing drift into the row above or below results in a much longer dark pulse width producing a detectable error from the optical character reader with an alarm to notify the operator to correct the vertical alignment of the line printer.

Similar error detection has been designed into the system for horizontal spacing errors. For example, in the four line bar code should one or more lines drift left or right, the phase of the four channels would be not synchronous. In the event the horizontal drift or error becomes so large as to approaches a full space (1/10 inch), the logic is arranged to require a binary code 11, 12 or 13 in the first digit, a binary code 14 in all blank digits, and a binary code 15 in the last digit space. It is obvious that these conditions would not be met, and the horizontal error would be immediately detected. Of course, other unique logic arrangements can be used to detect misalignment errors due to faulty printer set up. For the 0.1 inch bar code spacing shown, the printer can shift position ±.050 inch, i.e., a half-space, yet the code is readable. Ability to accept carriers within such a latitude is an important aspect of the invention. While all the embodiments of FIGS. 2, 4 and 5 are suited to computer controlled line printing, that of FIG. 5 can be printed the fastest as it is completed in one line.

The code sequences of indicia 24a are important, and the binary I-bar code repesentation 24b of the indicia 24a is specially adapted for the instant carrier invention. Code sequence 70 (see FIG. 2) has a number of subunits, some of which are optional. Unit 71 is the zip code of the account (cardholder). Unit 72 is conveniently the batch number of cards in that particular issue. Unit 72 may also be or include an issue number, a batch number, quantity number, process date (Julian day), or an issue and batch number, or an issue, batch, card or carrier sequence number depending on the number of digits and spaces. While shown as a three-digit number, it may be any number of digits to include the desired identification. Units 71 and 72 may be to the left of unit 73 as shown, or to the right of unit 78.

Unit 73 is the number of cards in the account, e.g., 1 to 3 in the example of FIG. 2 (or 1 to 6 if piggybacked), 1 to 8 in FIG. 4 and 1 to 12 for the double carrier III and IV of FIG. 1. An important aspect of this invention is the binary designation of 11 for one card, 12 for 2 cards (as shown in FIG. 2), and 13 for 3 cards in the account. Where there are up to eight cards in a carrier (four retail card slits carrying two cards each in piggy-back configuration), the unit 73 may be 2 or 3 digits (spaces) wide for the appropriate binary code. Thus, binary 13 in the first space followed by binary 13 in the second and binary 11 in the third indicates 7 card total (3+3+1); 13, 12, 10 (or 14) indicates 5 cards (3+2+0), and the like. In normal binary code the values are 0 through 9, whereas in the present code the values ar 1–10. In normal binary, nothing (no mark) in a space means zero. In the preent code, zero is an error and detactable as such in the present binary bar code. For spaces between numbers or units, a binary 14, i.e., a 2 bar plus 4 bar plus 8 bar is used in the instant code, and is detectable as such. There is no confusion between a zero and a space in the code of this invention.

Unit 74 is the number of the issuer, e.g., the bank, savings and loan, company, etc. Unit 75 is the branch number of the bank, factory number, type of account, state code or the like, as desired. Unit 76 is the account holder number. Unit 77 may be unused and provides for growth in the number of accounts, or may be used as a carrier sequence number, or the like. Unit 78 is a stop scan command number.

There are a maximum of 19 digits, including spaces, in a credit card account number. In the carriers of this invention we provide a minimum of twenty-one and a maximum of twenty-eight words, including spaces, in the field 73–78. Nineteen of these words correlate to the credit card account number, and one word is for an end sentinel (stop scan signal) 78. In the figures, one word (position, space, character or binary digit) has been provided for the number of cards 73 for our minimum of 21. Whe more than three cards are inserted in the carriers, up to two additional words are provided for the number of cards 73. Optionally, we provide one word for start scan and one for a parity check, for a total of 25 words in the field length. In the embodiments illustrated in FIGS. 1–3, 7 and 8, the distance between adjacent slit center lines is 2.8 inches (7.112 cm) for standard credit cards (see FIG. 8). That is the scan path length since the carrier moves relative to the OCR 95 that length each time the carrier is indexed into insertion position. This permits expanding the field length to 28 words to satisfy other functions, e.g., for sequence numbers, issue code numbers, batch numbers, batch numbers, issue code numbers, batch numbers, and the like. Non-account information, such as 71, 72 (FIG. 2) may lie to the right or left of the field 73–78.

Note also that the binary 14 is a space in the I-bar code 24b, while the stop scan is a binary 15. Thus, the binary representations of numbers 1–9 are conventional, zero is binary 10, and 11–15 have special meaning as described above. Thus, if an 11–15 appears in a number space due to printer misalignment of the bars, it is detected as an error signal. As seen in FIGS. 4 and 5, the zip code and issue or batch numbers may be omitted where desired from the indicia line 24a. The brackets 73–78 above the indicia 24a correlate to the brackets 73–78 below the I-bar code 24b, and the I-bar code can be visually read if desired.

FIG. 7 shows another embodiment of a carrier form in which the B panel contains a plurality of tear-out wallet cards 78, 80 and 81 which are defined between fold lines 16 and 17, the marginal edge 2, and tearable perforation lines 82, 83 and 84 spaced inwardly from the margin. While three cards are shown, to correlate with the number of cards issued to that account 73, there may be any desired number of cards of smaller or larger size, space permitting. For example, four cards slightly smaller in width may be spaced between margins 2 and 11, or the space above card 78 in the C panel may be used to provide additional cards.

FIG. 7 also identifies line-by-line the printer layout for a debit or account-type card. The lines are numbered L1 through L26 along the left side in the figure for convenience in this description, but ordinarily would be omitted in carriers used in practice. The information on a line-by-line basis is:

Line 1: Name of card issuing bank;
Line 2: Phone number of that bank to call if cardholder has a question about his or her card;
Line 3: Person to ask for when calling;
Line 4: Credit card account number, number of cards and credit limit;
Line 5: Savings account number;
Line 6: Checking account number, machine cash withdrawal limit;
Line 7: Primary account holder name;
Line 8: Address line one;
Line 9: Address line two;
Line 10: City, State, Zip code;
Line 11: First name and middle initial on cardholders 1, 2 and 3;
Line 12: Credit card account number (account No. 1);
Line 13: Savings account number (account No. 2);
Line 14: Checking account number (account No. 3);
Line 15: Withdrawal; the types of accounts from which that cardholder may withdraw;
Line 16: Deposits; the types of accounts into which that cardholder may make deposits;
Line 17: Transfers from (out); the types of accounts between which that cardholder may transfer funds;
Line 18: Transfers to (in); the types of accounts between which that cardholder may transfer funds;
Line 19: Credit limit;
Line 20: Authorized cash removal (by machine) in the designated time period;
Line 21: Number to call if cardholder has any questions;
Line 22: Zip code, batch number, sequence number, card quantity and credit card account number followed by stop can code;
Line 23, 24, 25, 26 : All I code binary representation of card quantity, and embossed account number.

EXAMPLE

Figure 8:
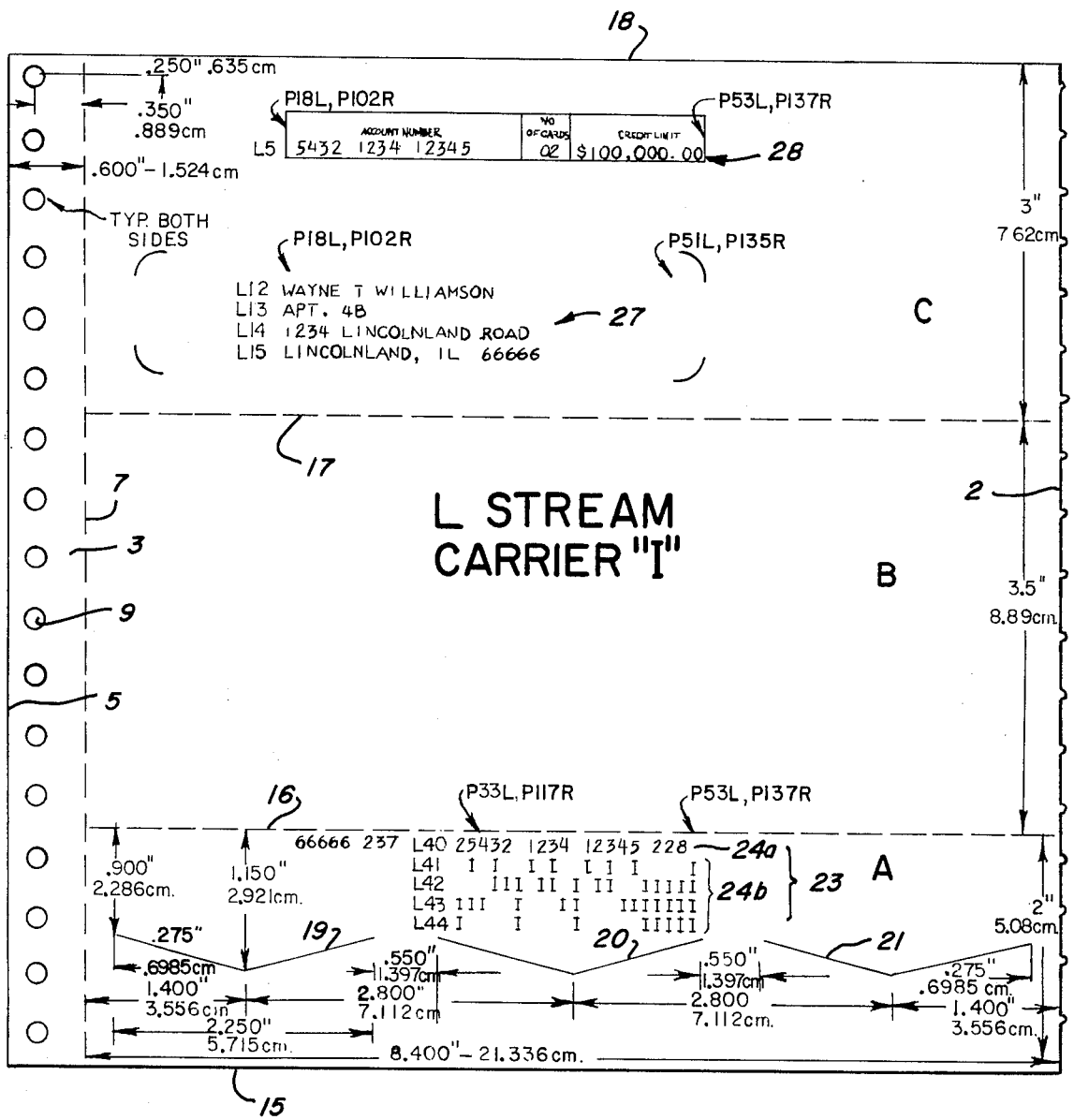
FIG. 8 is a plan view of the preferred carrier embodiment of this invention showing the critical location, spacing and dimensions for 3-panel carriers having three pockets for standard credit-sized cards.

FIG. 8 illustrates a carrier of the type shown in FIG. 1 in the face-up orientation. The dimensions of the carrier are marked in the figure. Also, numbering vertically down the form from the top, the line-by-line positions of the indicia disussed above are identified with the prefix L, as L15 to identify the city, state and zip code. These positions are the positions for an IBM Model 1401 line printer of 132 position capacity, but any available capacity machine may be employed, e.g., 120–164 position printers. The character positions across the carrier form (from left to right in FIG. 8) are also identified with the prefix P, as P53 to identify the end signature (stop scan) binary code. The L or R following a P number refers to the left or right carrier orientation in a two-wide carrier stream. The carrier shown is the left carrier, or carrier I in the L stream of FIG. 1. Thus, the end signature on this carrier is position P53L. The identical end signature for carrier II in FIG. 1 would be P137R. 18L, 102R and 51L, 135R are the start and the end, respectively, of the address space for the Left and Right streams.

This carrier may be used for hand or automated stuffing of standard sized credit or debit cards. In automated stuffing, the VIS machine using the carrier of FIG. 8 is capable of inserting 1200 carriers/hr with three cards/carrier (account). This compares to 150 carriers/hour with an average of 2.7 cards/carrier by hand stuffing for carriers of the prior art.

Figure 6:
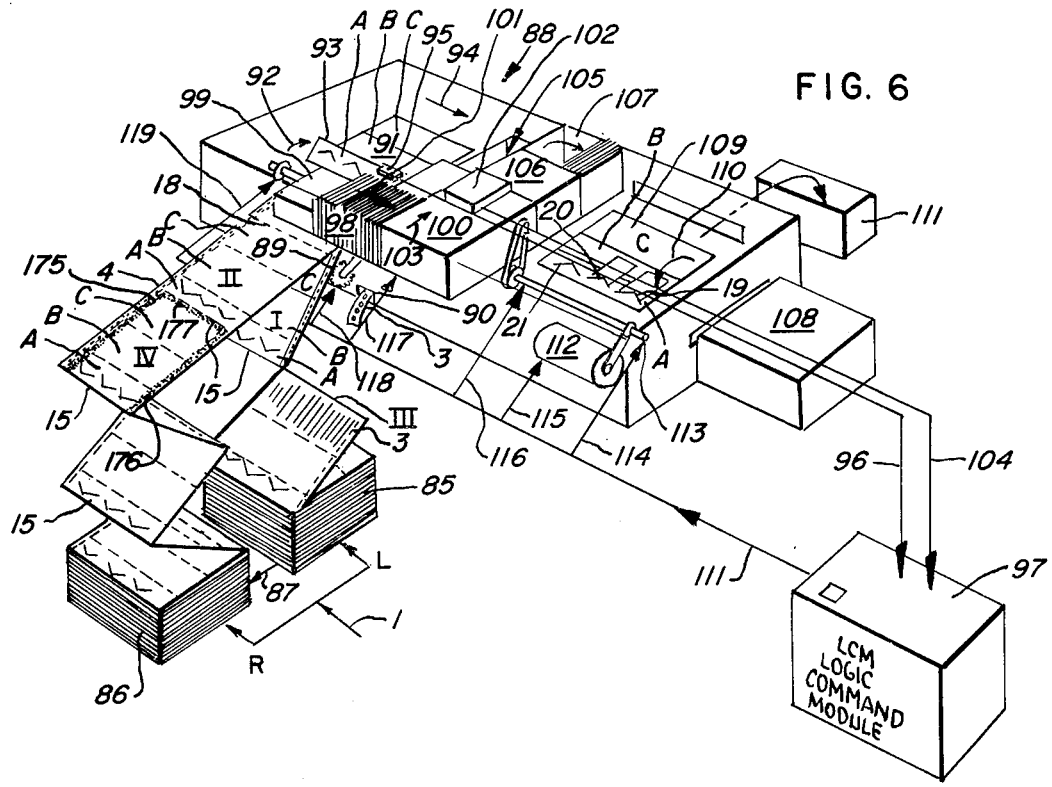
FIG. 6 is a highly simplified, partly schematic overview of an apparatus and method for mechanical insertion and folding of cards in the special carriers of this invention.

FIG. 6 shows in perspective one embodiment of a verifier-inserter system for automatic folding and inserting of credit cards in the carriers of the present invention. The two-wide carrier form set 1 of FIG. 1 is split or boned along perf 2 to provide an L stream and an R stream which are fan folded into two stacks 85 and 86, respectively. The stacks are shown separately in FIG. 6 but they may be interleaved as shown by arrow 87. The streams are fed into the VIS unit 88 upside down with the L carrier stream under the R stream. The L stream is advanced into the VIS unit by pin or friction drive 89 engaging the carrier stream web or holes 9 in the marginal drive strips 3,4. The marginal drive strip 3 is peeled off the carrier form prior to the first folding step and is withdrawn at slot 90. Similarly, the R carrier stream is advanced by drive strip 4 coacting with a corresponding pin drive (not shown) and that strip is peeled off the carriers.

It is preferred to slit or bone off the drive strips with a decollator prior to the carrier streams entering the VIS unit. Boning is breaking the ties (pieces of paper between cuts; a cut plus tie is a perf), and this may be accomplished in a conventional decollator, for example, a Moore Business Forms, Inc. Model 284B decollator. Boning is preferred to slitting as the operator may misalign the central and marginal slitters to produce the wrong-sized forms. Where the strips are boned or slit prior to feeding into the VIS, advancement of the carrier forms through the VIS are by friction drive rather than by pin drive.

The carriers enter the unit C panel first. The carrier form is then separated (burst) from the subsequent carrier along stream fold/burst lines 15 or 18 (as the case may be), e.g., by drawing the carrier under tension across a relatively sharp edge or wire (burst bar). The A panel of the separated carrier 91 is simultaneously or sequentially folded back toward the B panel as shown by arrow 92 and retained at an acute included angle as shown at 93 in FIG. 6. The carrier is then advanced or indexed sideways, as shown by arrow 94 so that read head 95 scans the information means 24b. In this embodiment, the read head is an optical character reader scanning I-bar code. The head may be any other type above described to scan the appropriate mode of information from the carrier, i.e., mag stripe, mag code, delta distance code, punch holes, embossed characters or the like. The scanned information is transmitted by line 96 to a logic and command module 97 (LCM). The LCM stores the information about the carrier including account identification number and number of cards to be inserted in that carrier.

A stack of credit cards 98 is placed in a receiving tray of the VIS unit. The cards are advanced by pusher 99 to a picker 100 as shown by arrow 101. The cards are removed from the stack one by one and advanced through an embossed character reader (ECR) 102 as shown by arrow 103. The ECR reads the account number embossed on the card and the information is transferred to the LCM 97 via line 104. It should be understood that the card reader may be any type of reader and is not limited to an embossed character reader. For example, the reader may contain heads for reading magnetic stripes, indicia or bars on or embedded in cards, or an optical reader for reading characters, indicia, fonts, color bars and the like printed on or embossed in the cards.

The LCM compares the information from the carrier and the card, e.g., bar code to embossed, or embossed to magnetic, magnetic to magnetic, punch to embossed, punched or embossed to magnetic, and the like, or vice versa. If there is a match, the card is placed into an insertion mechanism 105 by a laydown mechanism 106 and inserted into the first slot 19 of the carrier. If the card does not match the carrier, the card is ejected to reject tray 107, or the carrier is advanced to reject tray 108. the LCM then initiates a search mode in which cards 98 are advanced through the read station 102 until the correct card for the carrier is found. Alternately, the VIS can search through the carrier by advancing them through the read station 95 until the matching carrier is found. It is preferred to search the cards since the rejects may be replaced, in sequence, from reject tray 107 to the card feed tray 101 more simply than refeeding carriers after finding the correct card. Further, if one or more cards have been inserted in the carrier to find the card than advance the carrier.

Where there is verification, i.e., a match between card and carrier, the card is laid down and inserted. Where the information from the carrier indicates a second card is required, the carrier is advanced to align a second pocket with the insert mechanism. The cards and carriers are advanced simultaneously so that the card will be in place for insertion in the pocket upon indexing (advancing) of the carrier pocket into position. When the correct number of cards are inserted in the carrier, two are shown in FIG. 6 in pockets 19 and 20 at position 109, the carrier is advanced again out of the insert mechanism and the C panel folded over the exposed cards in the A panel as shown by arrow 110. The completed, inserted and folded carrier is then stacked as at 111, or forwarded directly to a mailing envelope stuffing operation or to be scanned prior to stuffing in a pre-mailing pulling and checking operation.

The command outputs from the LCM 97 are shown in FIG. 6 in schematic as carried by line 111 to activate the VIS motor 112 which transfers power to the various subunits described above by jack shaft 113. Power is selectively transferred to the individual subunits by selective activation of clutch means on the jack shaft on command from the LCM via lines 114 through 119; to the power clutch (line 114); motor stat (line 115); picker and card laydown mechanism 116. Likewise, power is activated off the jack shaft via line 117 for indexing the carrier, via lines 118 and 119 advancing the carrier streams into the VIS unit, and for the final fold all by clutches on command from the LCM.

Figure 9:
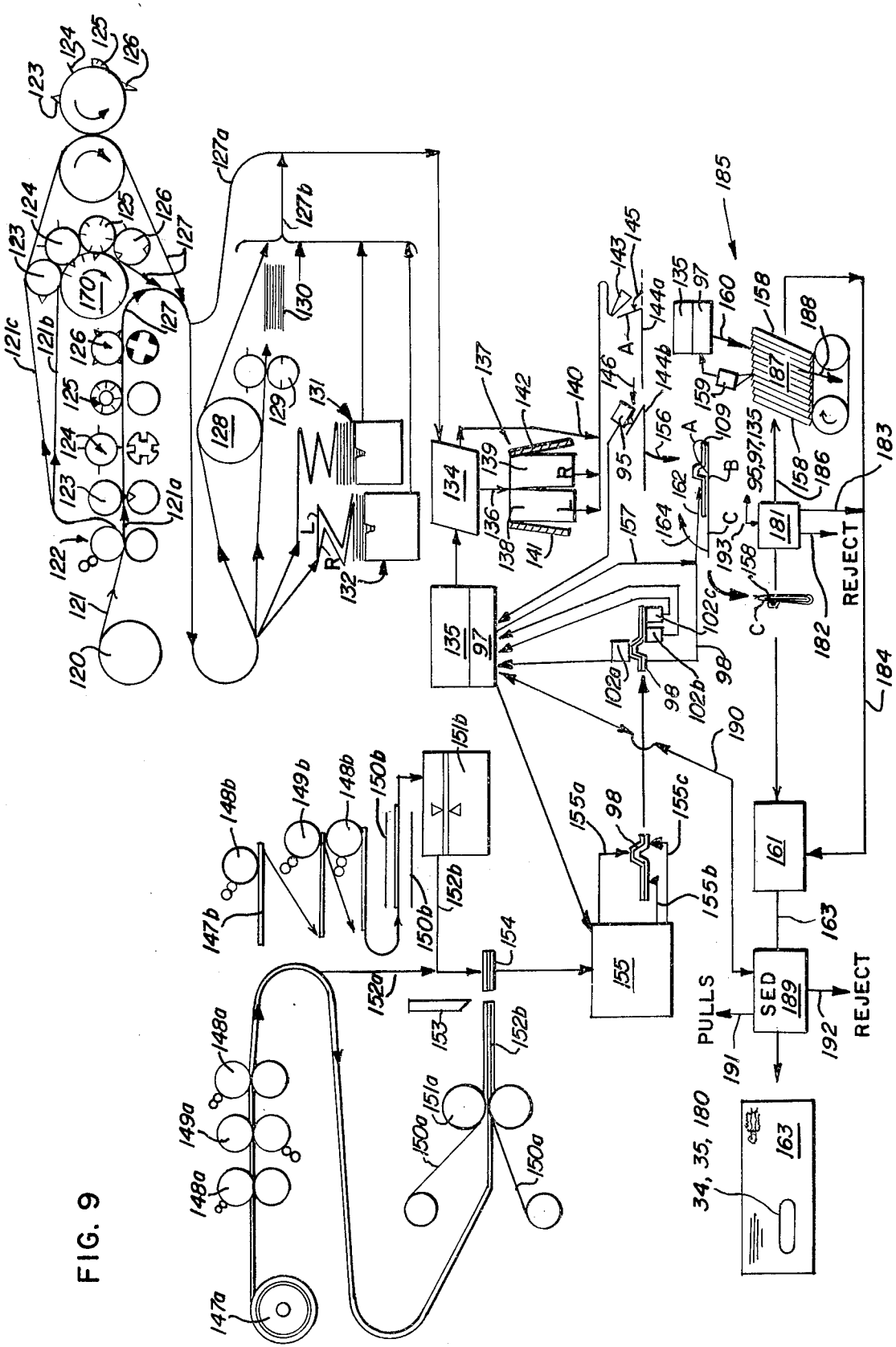
FIG. 9 is a schematic diagram of the method of producing carriers in accord with the invention.

FIG. 9 shows in schematic the overall process steps for producing, inserting and folding the carriers of this invention. A webroll 120 of suitable sheet material 121 is printed on a web press 122 with a desired design and instructional and/or contract indicia. FIG. 9 then shows three alternate modes of perfing, punching and slitting or boning, as identified by following webs 121a, 121b or 121c. Following first web 121a, roller punch 123 punches out the sprocket drive holes 9 or 9' (see FIGS. 1 and 3) in the carriers or marginal drive strips. The web is then transversely perforated (lines 15, 16, 17, 18 in FIG. 1) by transverse perf rollers 124. The printed web is then perforated axially (longitudinally) by perf rollers 125 in one to three parallel lines, perfs 2, 7 and 8. Simultaneously, or before or after the horizontal perfing, the slits or slots are cut into the web by roller-mounted cutters 126.

Web 121b shows these operations 123–126 sequentially with one under-web pressure roller 170, and web 121c shows these operations 123–126 in a 2-roll press. The operations 123–126 may occur in any desired sequence.

After these operations the web 127, containing completed blank carriers, goes to one or more of four optional operations. The web may be rolled up at 128 as a roll of completed carriers for transport and/or future use. The web may be fed to a rotary chopper 129 and stored as a stack of completed carriers in individual sheets 130. This is particularly useful in the cse of carriers for hand insertion, such as carriers I and II of FIG. 1 not having drive margins. The carriers may be separated down the central longitudinal line 2 (FIG. 1) before chopping and stacking. In the third alternative the carrier form sets may be folded along fold lines 15, 18, 22 (FIG. 1) to form a fan-folded stack 131. Another alternative involves splitting (separating) or boning the web longitudinally by a roller-type slitter and fan folding the resultant L and R streams (shown in FIG. 9) together so they are interleaved as a single interleaved stack 132.

Any of these forms of the carrier sets are then forwarded to the second stage of operations, that of printing or encoding individual account information in individual carriers, inserting cards and folding them. The continuous web be carrier 127a coming directly from the carrier preparation operation, or the various alternate forms of carriers 127b, is fed to a printer (imaging device) or encoder unit 134 which is controlled by a process control and customizing computer (or computer-generated tape) 135 which contains data on the invididual accounts. In the example shown, printer 134 is a line printer that prints information on the carrier of the type shown in FIGS. 2, 4, 5, 7 and 8, including the I-bar code. The printed two-wide carrier stream 136 is then slit or boned, and the marginal drive strips 141 and 142 removed, e.g., in a decollator operation 137, forming two streams, and L stream 138 and an R stream 139 and fed into the VIS unit, singly or interleaved, as shown by the arrows. Alternatively a one-wide stream 140 can be fed directly into the VIS from the printer 134.

In the VIS the stripped form sheets, streams or webs 138, 139, 140 are passed over a burst bar 143 and separated into individual carriers 144a, 144b along lines 22, 15 and 18 (FIG. 1). The A panel of the carrier is then folded over as shown by arrow 145 and the carrier advanced (arrow 146) past read station 95 into the first insertion position. The read head 95 optically or electromagnetically reads the I-bar code, and information is transferred to LCM 97 as earlier described.

Plastic credit card core stock 147 (shown as 147a in roll form, 147b in sheet form) is printed on the front side 148a or b, and on the backside 149a or b, in one or more colors. The printed stock is then laminated on one or both sides with transparent plastic sheets 150a and/or 150b in roll press 151a or sheet press 151b. Individual cards are produced from the core stock 152a or laminated sheet 152b by reciprocating punch 153 to produce virgin credit cards 154. The virgin cards are embossed or encoded (mag stripe) with individual account information in embossing or mag stripe encoding unit 155 (e.g., a Data Card embossing or map stripe encoding unit), which is fed the appropriate information on the same or different computer 135 or LCM 97. 155a represents embossing, 155b represents encoding a mag stripe, and 155c represents other impressing or encoding information by other means. For example, when the carriers are read by scanner means 95 and information transferred to LCM 97, the LCM can command the embossing or encoding unit 155 to emboss or encode virgin plastics with the correct information so that the cards and carriers are in proper sequence. The cards are then passed directly to the insertion means 105. Conversely, the embossing/ encoder can control the VIS insertion operations by location of the computer (or tape) 135/LCM 97 in the embosser/encoder 155.

The embossed cards 98 are forwarded to the VIS unit where the embossed or encoded information is read by reader 102 (102a embossing, 102b mag strip reader, 102c "other" reader), which forwards individual card information to the LCM 97 which may be part of computer 135. In the LCM 97, the information from the carrier via reader 95 is compared with information from the cards via reader 102. If there is a match (verification) the LCM commands the VIS unit to insert a card in the waiting, partly folded carrier 156, the output command function being shown schematically via line 157. The direction of card insertion is shown by arrow 162 in FIGS. 2, 4, 5 and 9.

Where, for example, the account information indicates only one or two cards are appropriate for the carrier, the carrier will be cycled sequentially through two or one insertion positions, respectively, without cards being inserted. This is accomplished by a command function which causes the card picker to retract or stop, while the carrier continues to be advanced. The retracted picker may cycle without picking and advancing cards through the card read station, laydown door and insertion tray. In addition, where there is a carrier/card mismatch, the logic/command module operates to cycle through a plurality of cards while the carrier remains stationary. Rejected cards are retained in a reject tray and may be recycled to the load tract. This search mode may be repeated as desired by an operator.

The carrier with its individual complement of cards 109 is then advanced through a fold station 164 where the C panel is folded along fold line 17 completing the folding of the carriers 158. The folded carriers 158 exit the apparatus folded and in account sequence. The completed carriers are oriented in a manner that account information is presented in a suitable position, e.g., along the upper edge (see FIG. 2), so that it may be selectively read or sensed for further processing or checking, e.g., pulling or checking.

In the verification operation, verifier unit 181 checks the number of cards inserted in a folded carrier. This is done by serially passing completed, inserted and folded carriers 158 horizontally (e.g., direction of arrow 69 in FIG. 2) between the nip of a pair of rollers, one fixed and the other movable, and determining the thickness of the carriers 158 at the position of each pocket by sensing the relative deflection of the movable roller. This sensed verification information is forwarded via line 193 to computer/LCM 135/97 and compared to the proper number of cards that should be in the carrier as sensed by read head 95 (or as instructed by computer or tape data in 135/97). Where there is a mismatch, the computer/LCM 135/97 commands the verifier to reject the carrier at 182. The verified carriers may pass directly to an envelope stuffer 161 via lines 183, 184 or pass to a pulling unit 185 via line 186.

In the pulling operation 185 the inserted carriers 158 are scanned or read by a read head 159 which transmits information to LCM 97 and/or computer 135 which compares the data with an updated approved list. If there is need for a last-minute pull, the computer, tape or LCM activates a reject unit 160. It is preferred to pass the carriers 158 through the pulling unit serially, as described above for the verifier unit, with read head 159 scanning the information (23, 24, 25, 26, 27, 28 180 FIGS. 1–8) on the carrier as the completed carriers pass the head, and pulled carriers being rejected as bad accounts are identified. In the alternative, as shown in FIG. 9, the carriers may be scanned in a stack 187, with pulled carriers being rejected at 188. The updated batch of completed carriers are then forwarded to mailing envelope stuffer 161.

The completed carriers, alone or with other mailer information, are then inserted or stuffed into envelopes by hand or in an automatic main inserting unit 161 (such as a Pitney Bowes 3144 "Insertamax" high-speed automatic mail insertion unit, or a Bell & Howell/Phillipsburg automatic envelope inserter).

The completed, stuffed envelopes 163 are mailed or delivered to customers (account holders) directly, completing the process, or may be processed in a sealed envelope detector (SED) 189 having a scanner unit like units 95 or 159 (not shown in detail). The information 23, 24a or 24b is positioned to be read through the envelope, e.g., windows 34 or 35 on the front or back of the envelope (see FIG. 2 and accompanying description above), or from the envelope itself, e.g., label 180 applied directly to the front or back of the envelope. The scanned information, e.g., in the form of optical, electronic or electrically detectable pulses, is passed to the computer/LCM 135/97 via line 190 where it is compared to the updated approved list. If the particular account is bad, the computer LCM 135/97 commands the detector to pull the envelope shown at 191. The sealed envelope detector (SED) also senses the number of cards in the carrier and rejects incorrect ones at 192 in the manner above described for the verifier unit 181. The SED may have its own scanner, or may use information from scanner 95 or 159 without need to scan the envelopes or windows. This is preferred where the SED is integrated with the VIS unit of FIG. 6.

Within the spirit of the invention we may position information 23 and/or bar code 24b or the like, on the B panel (see information 23, 24a, 24b on carrier II in FIG. 3) so that when the completed carrier is stuffed into an unsealed envelope, the bar code is revealed in the triangular area between the upper edge of the envelope flap and the back panels of the envelope. The bar code is thus presented for automated or manual (visual) "reading" for verification and pulling just prior to sealing. In an alternate embodiment, the back of the envelope may have a special window juxtaposed opposite information (23, 24a, 24b) for verification and/or pulling after sealing by reading through the window. In still another embodiment, a line printer may be used to print the information 23, 24a, 24b on labels which may be applied to blank carriers, mailers or envelopes. The labels may then be applied to the carriers or mailers by the VIS unit, and to the envelopes by the verification, pulling, envelope stuffing, or SED units in accord with information in computer/LCM 135/97 sensed from credit cards as they are inserted in the carriers.

Likewise, the principles of automated scanning, insertion, verification, pulling, stuffing and sealed envelope verification and pulling disclosed herein may be applied to other types of carriers, including prior art carriers and future carriers. Thus, information 23 and/or information 24a (e.g., bar code) may be applied to single panel carriers, pocket carriers, mailing inserts, envelopes, and to labels applied to carriers, envelopes and mailers and the like, for automated inserting, verification, pulling and sealed envelope detection at various stages of operation as disclosed herein.

The slits of the invention may also be straight slits, parallel to an edge (e.g., a straight slit 40 in carrier I of FIG. 3), or a single straight slit may be inclined at an acute angle (with respect to an edge), e.g., in FIG. 2, extending limb 19a of slit 19 to the right for the full slit width. In another embodiment, slits or slots may be omitted, with the cards being wedge-trapped between the panels. The first end of the card (31 in FIG. 2) is trapped between the A and B panel, while the other end (32 in FIG. 2) is trapped between the card B panels.

The carriers of the instant invention can form their own envelope. For example, FIG. 2 shows the three panels stapled together by staple 178 at the left edge. The right edge is similarly staples (not shown), and an optional glue spot or stripe 179 along the inner (back side) edge 18 of the C panel completes the seal of the C panel to the A panel. The mailing address 27 may remain on the C panel or be placed on the B panel. FIG. 6 shows glue sripes 175, 176, 177 adjacent the side edges 12 and 2 respectively, and on the C panel of carrier IV adjacent fold/burst line 15. This glue is on the backside of the carriers. When folded, the carrier is sealed by the adhesive forming a completed envelope.

Various inclusive definitions used herein apply to terms in the claims as well. For example, reference to "credit cards" should be understood to include any type of card whether a credit, debit, account, access, identification, key, pass card or the like. "Carriers" or "credit card carriers" includes carriers of any kind and includes mailers and/or envelopes therefor where applicable. "Information" includes information relating to the cardholder and/or account as applicable and includes any form of representation. "Indicia" or "number" includes markings of all sorts, numbers, letters, designs, fonts, codes and the like. "Pulses" includes any form of information bit transfers whether mechanical, electrical or in the electromagnetic wave spectrum, for example, electrical signals, visible, UV or IR light waves, microwave, magnetic bubbles and the like. "Readable" or "scannable" includes any manual (visual) or mechanical manner of ascertaining information from the carriers or labels, and by "mechanical" is meant to be included in whole or in part any optical, electro-optical, magnetic, electronic, electromechanical, electric, and purely mechanical methods and apparatus. Reference to "cardholder account number" or "account number" includes any unique identifying or code number relating to an individual cardholder and is not restricted to a financialtype account. It may include a number assigned to an employee permitting access to certain buildings, rooms, files and the like. "Web" includes an extent of sheet material whether in single sheet form or continuous form.

It should be understood that various modifications within the scope of this invention can be made by one of ordinary skill in the art without departing from the spirit thereof. We therefore wish our invention to be defined by the scope of the appended claims as broadly as the prior art will permit, and in view of this specification if need be.

We claim:
1. Improved credit card carriers comprising:
   a. a web of sheet material having a pair of substantially parallel side edges, a top edge and a bottom edge;
   b. a plurality of foldable panels defined by fold lines disposed medially of, and substantially parallel to, said top and said bottom edges;
   c. a plurality of means for receivingly engaging credit cards disposed in at least one of said panels;
   d. said panels being adapted to wedge trap said cards when folded with said cards disposed between said panels.

2. Carrier as in claim 1 wherein said panels are three in number.

3. Carrier as in claim 1 wherein said engaging means is selected from slits and slots.

4. Carrier as in claim 3 having a plurality of engaging means each of which is capable of retaining at least one card.

5. Carrier as in claim 4 wherein each of said engaging means is a slit, each slit being adapted to retain at least one card.

6. Carrier as in claim 5 wherein said slits are generally characterizable as selected from a straight slit, V-shape, an A-shape, an m-shape, a w-shape, a U-shape and an inverted U-shape.

7. Carrier as in claim 6 wherein all of said slits are disposed in a first panel defined between a bottom edge and a first fold line.

8. Carrier as in claim 7 wherein said slits are V-shaped.

9. Carrier as in claim 8 wherein said V-shaped slit is oriented with the tip of the V closest to said top or bottom edge.

10. Carrier as in claim 9 wherein the width of said carrier, from side margin to side margin, is sized to fit a standard mailing envelope.

11. Carrier as in claim 10 wherein one of said panels has disposed thereon address-indicating indicia disposed to be revealed through a window in said envelope when said carrier is folded and inserted in said envelope.

12. Carrier as in claim 10 wherein said envelope is selected from a standard No. 9 or No. 10 envelope.

13. Carrier as in claim 12 wherein one of said panels has disposed thereon account cardholder account-type indicia disposed to be revealable through a window in said envelope.

14. carrier as in claim 13 wherein said envelope has a plurality of windows, adapted to reveal information on said carrier selected from said address, and one said account information, and a registered mail number.

15. Carrier as in claim 10 wherein one of said panels has disposed therein a wallet-type information card defined by perforations in said panel and removable from said panel.

16. Carrier as in claim 15 wherein the other two of said three panels are a second end panel defined between a top edge and a second fold line and a medial panel defined between said fold lines, nd at least one of said second end panels and said medial panels contains said wallet card.

17. Carrier as in claim 1 which includes a line of punch holes adjacent at least one of said edges adapted to engage a pin-type drive mechanism for advancing said carrier through operations of its manufacture, printing or handling.

18. Carrier as in claim 17 having a line of said punch holes adjacent each of a pair of opposed parallel edges, and said pairs of edges are selected from side edges, and said top and bottom edge.

19. Carrier as in claim 17 wherein said line of punch holes is disposed between said edge and a line of perforations located medially of said edge to define a removable drive strip.

20. Carrier as in claim 18 wherein each of said line of punch holes is disposed between said edge and a line of perforations located medially of said edge to define a removable drive strip.

21. Carrier as in claim 1 which includes readable information means disposed on at least one of said panels, and said information may be selected from one or more of
   a. cardholder identifying information;
   b. issurer information; and
   c. machine instruction information.

22. Carrier as in claim 21 wherein said information means is disposed adjacent one of said edges or said fold lines.

23. Carrier as in claim 21 wherein said information means is selected from means readable by visual, mechanical, electromechanical, optical, electronic, electric, magnetic, and electro-optical means.

24. Carrier as in claim 23 wherein said;
   a. cardholder identifying information is selected from information relating to:
      i. a cardholder account,
      ii. a cardholder identification number, and
      iii. a card number;
   b. said issuer information is selected from information relating to:
      i. an issue,
      ii. a batch,
      iii. a sequence or position in a sequence,
      iv. the number of cards issued to a cardholder,
      v. issuer identification,
      vi. a cardholder address,
      vii. credit, and
      viii. usage restrictions;
   c. said machine instruction information is selected from information relating to:
      i. the number of cards to be inserted in said carrier,
      ii. pulling a card, a carrier, an account or an envelope,
      iii. initiating or stopping an operation, and
      iv. identification of a carrier or a card.

25. Carrier as in claim 23 wherein said information means is selected from a magnetic stripe, a bar code, machine readable font, embossing, punched holes, and indicia of differing colors.

26. Carrier as in claim 25 wherein said information means is a bar code in binary code digit form.

27. Carrier as in claim 26 wherein said binary bar code is disposed on said panel so that it is readable when the carrier is in the folded condition.

28. Carrier as in claim 27 wherein said binary bar code is disposed on said panel so that it is readable through a window disposed in an envelope juxtaposed to reveal said bar code therethrough.

29. Carrier and envelope assembly comprising:
   a. a carrier as in claim 28, and
   b. an envelope having a window disposed in juxtaposition with said bar code so that said code is readable therethrough.

30. Carrier as in claim 27 in which said bar code is selected from magnetic ink, opaque ink, and transparent fluorescent ink.

31. Carrier as in claim 30 wherein said bar code is transparent fluorescent ink, said carrier includes cardholder address indicia, and said bar code is printed in association with said address indicia.

32. Carrier as in claim 27 wherein said binary bar code comprises a plurality of digit lines selected from a ones line, a twos line, a fours line and an eights line, said lines being disposed in one to four rows.

33. Carrier as in claim 32 wherein said binary bar code lines are disposed spaced apart along from one to three lines, and are simultaneously or sequentially readable by relative motion of said carrier with respet to a scanning means.

34. Carrier as in claim 33 wherein said bar code is I-bar code.

35. Carrier as in claim 34 in which binary 11, 12 12 and 13 in said I-bar code represents the number of cards.

36. Carrier as in claim 35 in which binary 14 in said I-bar code represents a space.

37. Carrier as in claim 34 in which binary 10 in said I-bar code repesents a zero 38. Carrier as in claim 34 in which binary 15 in said I-bar code represents an end signature.

39. Carrier as in claim 34 in which binary 10 represents a zero, binary 11, 12 and 13 represents the number of cards, binary 14 represents a space, and binary 15 represents an end signature, in said I-bar code.

40. Carrier as in claim 39 in which said bar code is selected from magnetic ink, opaque ink, and the transparent fluorescent ink.

41. Carrier as in claim 34 wherein said:
  a. cardholder identifying information is selected from information relating to:
    i. a cardholder account,
    ii. a cardholder identification number, and
    iii. a card number;
  b. said issuer information is selected from information relating to:
    i. an issue,
    ii. a batch,
    iii. a sequence or position in a sequence,
    iv. the number of cards issued to a cardholder,
    v. issuer identification,
    vi. a cardholder address,
    vii. credit, and
    viii. usage restrictions;
  c. said machine instruction information is selected from information relating to:
    i. the number of cards to be inserted in said carrier,
    ii. pulling a card, carrier, an account or an envelope,
    iii. initiating or stopping an operation, and
    iv. identification of a carrier or a card.

42. Carrier as in claim 32 wherein said binary bar code lines are disposed in four rows aligned one above the other so that they are simultaneously or sequentially readable by relative motion of said carrier with respect to a scanning means.

43. Carrier as in claim 42 wherein said bar code is I-bar code.

44. Carrier as in claim 43 in which binary 11, 12 and 13 in said I-bar code represents the number of cards.

45. Carrier as in claim 44 in which binary 14 in said I-bar code represents a space.

46. Carrier as in claim 43 in which binary 10 in said I-bar code represents a zero.

47. Carrier as in claim 43 in which binary 15 in said I-bar code represents an end signature.

48. Carrier as in claim 43 wherein said:
  a. cardholder identifying information is selected from information relating to:
    i. a cardholder account, p2 ii. a cardholder identification number, and
    iii. a card number;
  b. said issuer information is selected from information relating to:
    i. an issue,
    ii. a batch,
    iii. a sequence or position in a sequence,
    iv. the number of cards issued to a cardholder,
    v. issuer identification,
    vi. a cardholder address,
    vii. credit, and
    viii. usuage restrictions;
  c. said machine instruction information is selected from information relating to:
    i. the number of cards to be inserted in said carrier,
    ii. pulling a card, carrier, an account or an envelope,
    iii. initiating or stopping an operation, and
    iv. identification of a carrier or a card.

49. Carrier as in claim 43 in which binary 10 represents a zero, binary 11, 12, and 13 represents the number of cards, binary 14 represents a space, and binary 15 represents an end signature, in said I-bar code.

50. Carrier as in claim 49 in which said bar code is selected from magnetic ink, opaque ink, and transparent fluorescent ink.

51. Carrier as in claim 1 which includes means for securing said panels together so that said carrier may be mailed.

52. Carrier as in claim 51 wherein said carrier includes a front side and a back side, said cards are inserted in said receiving means from said front side, and adhesive is disposed adjacent each of said side edges and a top or bottom edge so that when folded said panels are secured for mailing.

53. Carrier as in claim 51 wherein said securing means includes a staple adjacent each of said side margins.

54. Carrier as in claim 53 wherein said securing means includes adhesive disposed on one of said panels medially of said side edges so that when folded the outermost of said panels will be medially sealed to another panel.

55. Improved credit card carriers comprising,
  a. at least one layer of sheet material,
  b. means for retaining a credit card in engagement with said sheet,
  c. information means, selected from mechanical, electromechanical, optical, electronically, electrically, magnetically and electro-optically readable means disposed on said sheet, and
  d. said information means may be selected from one or more of:
    i. cardholder identifying information;
    ii. issuer information; and
    iii. machine instruction information.

56. Carrier as in claim 55 wherein said information means is selected from a magnetic stripe, a bar code, machine readable font, embossing, punched holes, and indicia of differing colors.

57. Carrier as in claim 56 wherein said information means is a bar code in binary code digit form.

58. Carrier as in claim 57 wherein said binary bar code is disposed on said panel so that it is readable when the carrier is in the folded condition.

59. Carrier as in claim 58 wherein said binary bar code comprises a plurality of digit lines selected from a ones line, a twos line, a fours line and an eights line, said lines being disposed in one to four rows.

60. Carrier as in claim 59 wherein said bar code is I-bar code.

61. Carrier as in claim 60 in which binary 10 represents a zero, binary 11, 12, and 13 represents the number of cards, binary 14 represents a space, and binary 15 represents an end signature, in said I-bar code.

62. Carrier as in claim 55 wherein said:
a. cardholder identifying information is selected from information relating to:
  i. a cardholder account,
  ii. a cardholder identification number, and
  iii. a card number;
b. said issuer information is selected from information relating to:
  i. an issue,
  ii. a batch,
  iii. a sequence or position in a sequence,
  iv. the number of cards issued to a cardholder,
  v. issuer identification,
  vi. a cardholder address,
  vii. credit, and
  viii. usuage restrictions;
c. said machine instruction information is selected from information relating to:
  i. the number of cards to be inserted in said carrier,
  ii. pulling a card, a carrier, an account or an envelope,
  iii. initiating or stopping an operation, and
  iv. identification of a carrier or a card.

63. Method of producing carriers adapted for automated verification and insertion of credit cards therein comprising the steps of:
a. providing a sheet of material;
b. forming an area in said sheet defining an individual carrier form adapted to receive at least one of said credit cards,
c. placing information on individual ones of said carrier forms unique to individual cardholder accounts,
d. said placed information being disposed on said carrier forms so that said information is readable by mechanical reading means to provide information for said automated verification and insertion of credit cards in said carriers.

64. Method as in claim 63 wherein said sheet material is a continuous web, and said forming step includes forming separable areas in said web defining individual ones of said carrier forms.

65. Method as in claim 63 wherein said step of placing is selected from printing, embossing, punching, encoding, and affixing labels containing said information.

* * * * *

REEXAMINATION CERTIFICATE (160th)
United States Patent [19]
Hill et al.

[11] B1 4,034,210
[45] Certificate Issued Feb. 7, 1984

[54] CREDIT CARD CARRIERS AND METHODS OF MANUFACTURE

[75] Inventors: James E. Hill, Prospect Heights; Baesley I. Dahlstrom, Des Plaines; Robert D. Fisher, Melrose Park, all of Ill.

[73] Assignee: Dynetics Engineering Corporation, Wheeling, Ill.

Reexamination Request:
No. 90/000,269, Oct. 13, 1982

Reexamination Certificate for:
Patent No.: 4,034,210
Issued: Jul. 5, 1977
Appl. No.: 615,112
Filed: Sep. 19, 1975

[51] Int. Cl.³ .................................................. G06K 19/00
[52] U.S. Cl. ................................... 235/487; 53/266 A
[58] Field of Search ..................... 235/375, 379, 487; 229/68 R, 70, 75; 283/57, 58, 59, 66 R

[56] References Cited
U.S. PATENT DOCUMENTS

| | | | |
|---|---|---|---|
| 1,932,536 | 10/1933 | Standal | 229/92.1 |
| 3,508,702 | 4/1970 | Kaiser | 229/71 |
| 3,704,015 | 11/1972 | Holovka | 270/52 |
| 3,941,308 | 3/1976 | DiGirolomo | 229/69 |
| 3,999,700 | 12/1976 | Chalmers | 229/68 R |

FOREIGN PATENT DOCUMENTS

| | | |
|---|---|---|
| 1179457 | 4/1967 | United Kingdom . |
| 1360288 | 1/1972 | United Kingdom . |
| 1364149 | 8/1974 | United Kingdom . |

OTHER PUBLICATIONS

1971 Credit Systems Inc. carrier form for First National Bank of St. Louis.
1972 Moore Business form for First National Bank of Toledo.
1971 IBM printed sample credit carrier form.
1972 Gem stores printed credit card carrier form.
1972 American Express's printed credit card carrier form.

*Primary Examiner*—Harold Pitts

[57] ABSTRACT

Single-sheet, multi-panel carriers for receiving and retaining credit cards during credit card issue and mailing procedures. Cards may be inserted in the carriers manually or by machine. Plural carrier forms are preferably provided in a continuous fan-folded web, and individual carriers are separable therefrom at perforations between subsequent and/or adjacent carriers. The carriers have special slits or slots for retaining one to four cards singly, or double that in a piggy-back manner, in vertical or horizontal configurations. Carriers also have a plurality of panels which assist in retaining the cards by wedge trapping during manual or machine issue processing (inserting, collating, verification and stuffing) and mailing operations. Carriers also carry verification and/or identification information thereon relating to the account, e.g., name, number of cards, account(s) number(s), credit limit, address, debit usage criteria, and the like, in one or more forms which may be read visually, electro-optically, mechanically, optically, electromechanically, magnetically and/or electronically. Carriers are specially adapted for production by sheet-fed glued, or roll-to-fold, high-speed web printing procedures. Imprinting of verification and/or identification indicia may be done by any impact or non-impact procedures, e.g., by drum, line, or computer-controlled, non-impact, spray-type printers.

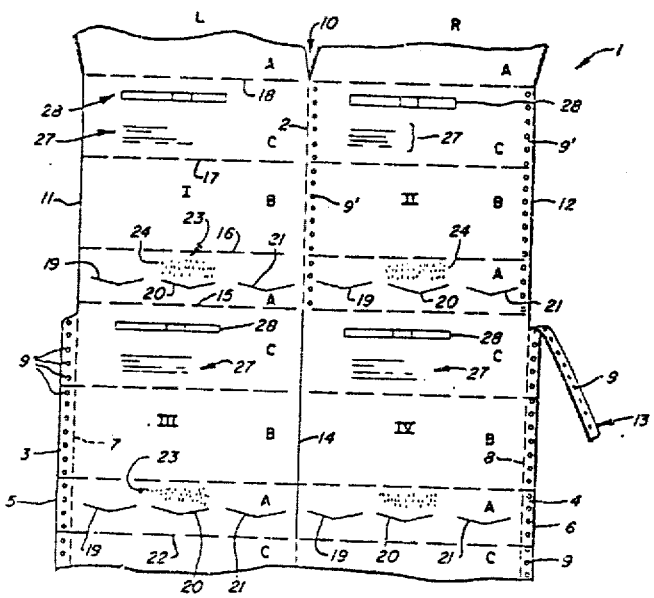

REEXAMINATION CERTIFICATE ISSUED UNDER 35 U.S.C. 307.

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 55, and 63 are determined to be patentable as amended:

Claims 2-54, 56-62, and 64-65, dependent on amended claims, are determined to be patentable.

1. Improved credit card carriers *for retaining cards without glue during automated credit card issue and mailing operations by automated credit card insertion machines* comprising *in operative combination:*
   a. a web of sheet material having a pair of substantially parallel side edges, a top edge and a bottom edge;
   b. a plurality of foldable panels defined *in said sheet material* by fold lines disposed medially of, and substantially parallel to, said top and said bottom edges, *the dimension between said top edge and said adjacent fold line, between said bottom edge and said adjacent fold line, and between said fold lines, defining the width, respectively, of each of said panels;*
   c. a plurality of means for receivingly engaging credit cards disposed in at least one of said panels *so that at least one edge of each of said cards is cooperatingly engaged between adjacent panels;*
   d. *at least one of said plurality of panels, adjacent said panel having said receivingly engaging means, having a width,*
   *as compared to, respectively,*
     *i. the length of said credit card when said credit card is disposed in said receivingly engaging means in a vertical orientation, and*
     *ii. the width of said credit card when said credit card is disposed in said receivingly engaging means in a horizontal orientation, sufficient to engage an edge of said card between at least two adjacent panels folded one onto the other adjacent one of said fold lines without substantially binding said adjacent panels; and*
   e. [d.] said panels being *operatively* adapted to *retainingly* wedge trap said cards when folded with said cards disposed between said panels *by the cooperation of said receivingly engaging means and the engagement of at least one edge of said cards between adjacent panels to prevent said cards from becoming canted or loose in the folded carrier.*

55. Improved credit card carriers *for retaining cards without glue during automated credit card issue and mailing operations by automated credit card insertion machines* comprising [,] *in operative combination:*
   a. at least one layer of sheet material [,] *specially adapted for cooperation with drive mechanisms of said automated credit card insertion mechines, and said sheet material being adapted for accurate sensing by machine scanning of information disposed thereon;*
   b. means *formed in said sheet* for retaining a credit card in engagement with said sheet [,];
   c. *machine readable* information means, selected from mechanical, electromechanical, optical, electronically, electrically, magnetically and electro-optically readable means disposed on said sheet [, and];
   d. said *machine readable* information means may be selected from one or more of:
     i. cardholder identifying information;
     ii. issuer information; and
     iii. machine instruction information [.]; *and*
   e. *said machine readable information means being disposed in position in preselected critical locations of special areas on said sheet material in properly aligned position to cooperate with read heads in said automatic card inserting machines to supply command information to said machines for high-speed automated insertion of the appropriate number of correctly matched cards into carriers provided to said inserter machines.*

63. Method of producing carriers *for retaining cards without glue during automated credit card issue and mailing operations by automated credit card insertion machines, which carriers are* adapted for automated verification and insertion of credit cards therein comprising the steps of:
   a. providing a sheet of material *adapted for accurate sensing by machine scanning of information disposed thereon;*
   b. forming an area in said sheet defining an individual carrier form adapted to receive at least one of said credit cards, *and adapted for cooperation with drive mechanisms of said automated credit card insertion machines;*
   c. placing *machine readable* information on individual ones of said carrier forms unique to individual cardholder accounts [,]; *and*
   d. said placed information being disposed on said carrier forms *in preselected critical locations of special areas on said sheet of material in properly aligned position to cooperate with read heads in said automatic card inserting machines so that said information is readable by mechanical reading means in said inserting machines to provide command* information *to said machines for high-speed* [said] automated verification and insertion of credit cards in said carriers.

* * * * *